US012516611B2

(12) United States Patent
Cooley et al.

(10) Patent No.: US 12,516,611 B2
(45) Date of Patent: Jan. 6, 2026

(54) TURBOCHARGER BEARING HOUSING

(71) Applicant: BorgWarner Inc., Auburn Hills, MI (US)

(72) Inventors: Matthew Cooley, Asheville, NC (US); Sebastian Schreiber, Mainz (DE); Martin Philipp Schön, Fürfeld (DE); Samuel Whitney Weldon, Hendersonville, NC (US); Aliihsan Karamavruc, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/673,618

(22) Filed: May 24, 2024

(65) Prior Publication Data

US 2024/0392696 A1 Nov. 28, 2024

Related U.S. Application Data

(60) Provisional application No. 63/468,973, filed on May 25, 2023, provisional application No. 63/522,209, filed on Jun. 21, 2023, provisional application No. 63/649,094, filed on May 17, 2024.

(51) Int. Cl.
*F01D 25/24* (2006.01)

(52) U.S. Cl.
CPC .......... *F01D 25/24* (2013.01); *F05D 2220/40* (2013.01); *F05D 2240/58* (2013.01); *F05D 2300/611* (2013.01)

(58) Field of Classification Search
CPC ............. F05D 2220/40; F05D 2240/58; F05D 2260/231; F05D 2240/15; F05D 2240/70; F05D 2240/12; F05D 2240/40; F05D 2260/30; F05D 2300/611; F01D 25/145; F01D 17/143; F01D 25/16; F01D 25/186; F01D 11/003; F01D 17/165; F01D 25/14; F01D 25/183; F01D 9/026; F01D 11/005; F01D 25/125; F01D 25/162; F01D 25/24; F01D 25/243; F01D 5/046; F04D 29/5853; F04D 29/403; F04D 29/4206; F04D 29/056
See application file for complete search history.

(56) References Cited

U.S. PATENT DOCUMENTS

| | | | | | |
|---|---|---|---|---|---|
| 6,155,780 | A * | 12/2000 | Rouse | F01D 11/18 415/173.6 |
| 9,194,256 | B2 * | 11/2015 | Purdey | F01D 25/186 |
| 9,638,203 | B2 * | 5/2017 | Bucking | F16C 35/042 |
| 9,732,767 | B2 * | 8/2017 | Cooley | F04D 29/5853 |
| 9,797,409 | B2 * | 10/2017 | Bucking | F01D 25/186 |
| 10,465,556 | B2 * | 11/2019 | Kurle | F01D 25/16 |
| 2010/0196148 | A1 * | 8/2010 | Gee | F16J 15/164 415/230 |
| 2016/0186779 | A1 * | 6/2016 | Cooley | F04D 29/4206 415/177 |
| 2019/0112945 | A1 * | 4/2019 | Kurle | F01D 9/026 |
| 2019/0120132 | A1 * | 4/2019 | Bogner | F01D 25/145 |

* cited by examiner

*Primary Examiner* — Eric J Zamora Alvarez
(74) *Attorney, Agent, or Firm* — von Briesen & Roper, s.c.

(57) ABSTRACT

A turbocharger bearing housing is disclosed. The turbocharger bearing housing comprises a main body extending radially outwardly forming a turbine end. The turbine end is formed having a complementary geometry with a turbine wheel. A passage is formed extending through the bearing housing to allow fluid communication with the exterior of the bearing housing.

19 Claims, 16 Drawing Sheets

TURBOCHARGER BEARING HOUSING

CROSS-REFERENCE TO RELATED APPLICATIONS

This application claims priority under 35 U.S.C. § 119(e) to U.S. provisional application No. 63/468,973 filed on May 25, 2023; U.S. provisional application No. 63/522,209 filed on Jun. 21, 2023; and U.S. provisional application No. 63/649,094 filed on May 17, 2024.

TECHNICAL FIELD

The present disclosure generally relates to turbochargers, and more particularly relates to bearing components and systems associated with turbochargers.

BACKGROUND

A turbocharger is a device used in combustion engines and power generators to increase their power output by compressing the incoming air acting as a forced induction system that utilizes exhaust gases to drive a turbine, which in turn drives a compressor. Turbochargers harnesses exhaust gas energy to force more air into the engine, enhancing its performance. The compressor then pressurizes the intake air, allowing more air to enter the engine's cylinders during each intake stroke. By compressing the incoming air, turbochargers permit higher fuel-to-air ratio, resulting in increased power output and improved fuel efficiency. Turbochargers are commonly used in automotive and industrial applications to boost engine performance.

Turbine wheels are used in turbochargers to increase the power and efficiency of internal combustion engines and power generators. Turbine wheels are mounted on a shaft and rotate at high speeds in response to exhaust gas flow. The primary function of a turbine wheel is to convert the energy of exhaust gases into rotational energy, which is then used to drive the compressor wheel of the turbocharger. As exhaust gases pass through the turbine housing, they strike the blades of the turbine wheel, causing it to spin rapidly. The rotation of the turbine wheel drives the compressor wheel on the other end of the shaft, which compresses fresh air and forces it into the engine's intake manifold or a power generator's air intake system or air induction system. This compressed air allows for more fuel to be burned, resulting in increased power output.

Turbine wheels may spin at rotational speeds in the order of hundreds of thousands of revolutions per minute. Turbine wheels are formed from a circular backwall with turbine blades attached in an even circular pattern on one of the flat surfaces of the back wall. In order to provide a lower inertia and lower stress along a back wall of the turbine wheel, the back wall may be scalloped between the turbine blades. However, traditional scallops cause efficiency losses for the turbocharger Turbocharger applications present challenges due to high temperatures and stresses, subjecting turbine wheels to significant thermal loads. Conventional turbocharger designs incorporate heat shields to minimize heat transfer from the turbine wheel to other components, like the bearing housing or compressor side. These shields act as thermal barriers between the turbine wheel and other turbocharger parts, reducing heat transmission to sensitive areas such as bearings, oil, and coolant systems. By providing a protective layer, heat shields minimize heat transfer, mitigating the risk of heat-related damage or performance degradation of surrounding components.

Others have attempted to provide solutions for heat shields between the turbine wheel and turbocharger, but fail to disclose a design that provides simplified assembly that avoids unwanted air circulation. For example, U.S. Pat. No. 9,797,409 discloses a turbocharger having a bearing housing integrated with a heat shield. However, this reference discloses a heat shield and the bearing housing assembled together as separate components creating suboptimal flow and cooling within the turbocharger. Heat shields pose challenges during assembly and can be cumbersome in the manufacturing process. Exploring alternatives that offer improved performance and easier installation would be desirable, as heat shields can be complex and time-consuming to assemble.

It can therefore be seen that a need exists for a turbocharger and bearing housing for engines and power generators that provides sufficient cooling engine and generator components that provides improved airflow performance and easier installation.

SUMMARY OF THE DISCLOSURE

In accordance with one aspect of the disclosure, a turbocharger bearing housing is disclosed. The turbocharger bearing housing comprises a main body extending radially outwardly forming a turbine end. The turbine end is formed having a complementary geometry with a turbine wheel. A passage is formed extending through the bearing housing to allow fluid communication with the exterior of the bearing housing.

In accordance with another aspect of the disclosure, a turbocharger system is disclosed. The turbocharger system comprises a bearing housing having a main body extending radially outwardly forming a turbine end, the turbine end having a complementary geometry with the turbine wheel, a shaft rotatably mounted in a shaft bore within the bearing housing, the turbine wheel being provided at an end of the shaft proximate to the turbine end; and a passage extending through the bearing housing to allow fluid communication with the exterior of the bearing housing.

In accordance with another aspect of the disclosure, a method of forming a bearing housing for a turbocharger is disclosed. The method comprises casting a bearing housing having a main body with a turbine end extending radially outwardly towards a turbine wheel, the turbine end having a complementary geometry to the turbine wheel.

These and other aspects and features of the present disclosure will be better understood upon reading the following detailed description when read in conjunction with the accompanying drawings.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Figure 1:
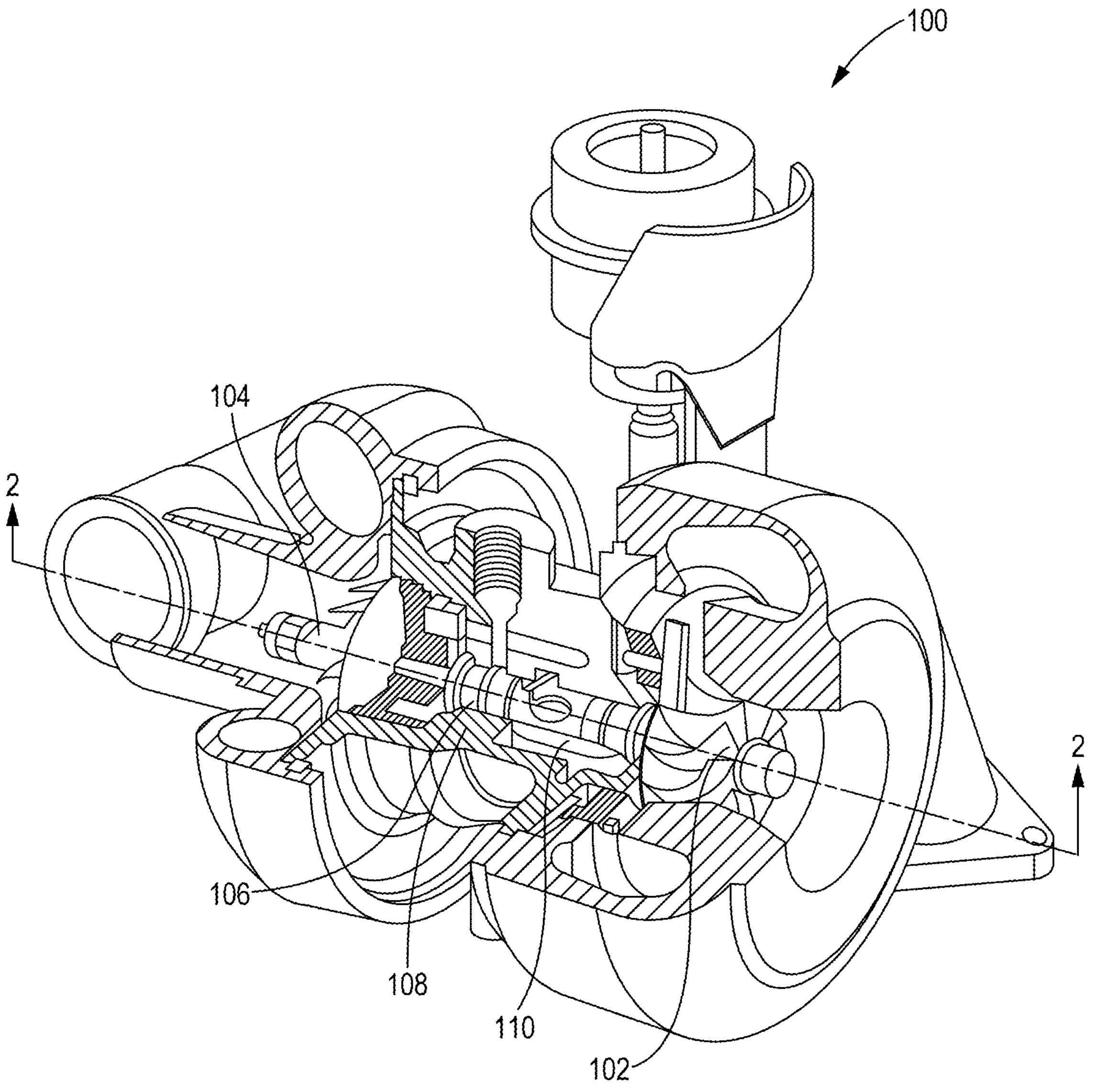
FIG. 1 is a perspective view of a turbocharger, according to one embodiment of the disclosure.

Referring now to the drawings, and with specific reference to the depicted example in FIG. 1, a turbocharger 100 for a generator is shown. While the following detailed description describes an exemplary aspect in connection with the turbocharger, it should be appreciated that the description applies equally to the use of the present disclosure in other applications including but not limited to gasoline generators, diesel generators, intercooled & recuperated power generators, rotary engines, gasoline combustion engines, and/or diesel engines employed in various automobiles, cars, trucks, SUVs, CSUVs, sport vehicles, racing vehicles, and other similar power generators and vehicles.

The turbocharger 100 includes a turbine wheel 102, a compressor 104 and a shaft 106 for rotatably coupling the turbine wheel 102 and the compressor 104. The shaft 106 extends through a bearing housing 108. The turbine wheel 102 may be located within a turbine housing, and the compressor 104 may be located in a compressor cover, as generally known in the arts. The compressor 104 may be a compressor wheel, as generally known in the arts. The shaft 106 may be provided in a shaft bore 110 in the bearing housing 108.

The turbine wheel 102 may be rotationally driven by exhaust gas exiting the turbocharger 100. The rotation of the turbine wheel 102 is communicated to the compressor 104 by the shaft 106. The compressor 104 may be used to increase the pressure of intake air prior to the air mixing with fuel for combustion in an engine or power generator. The rotation of the turbine wheel 102 creates a forced vortex, where the particle velocity and pressure change proportionally to the radius of rotation.

Figure 2:
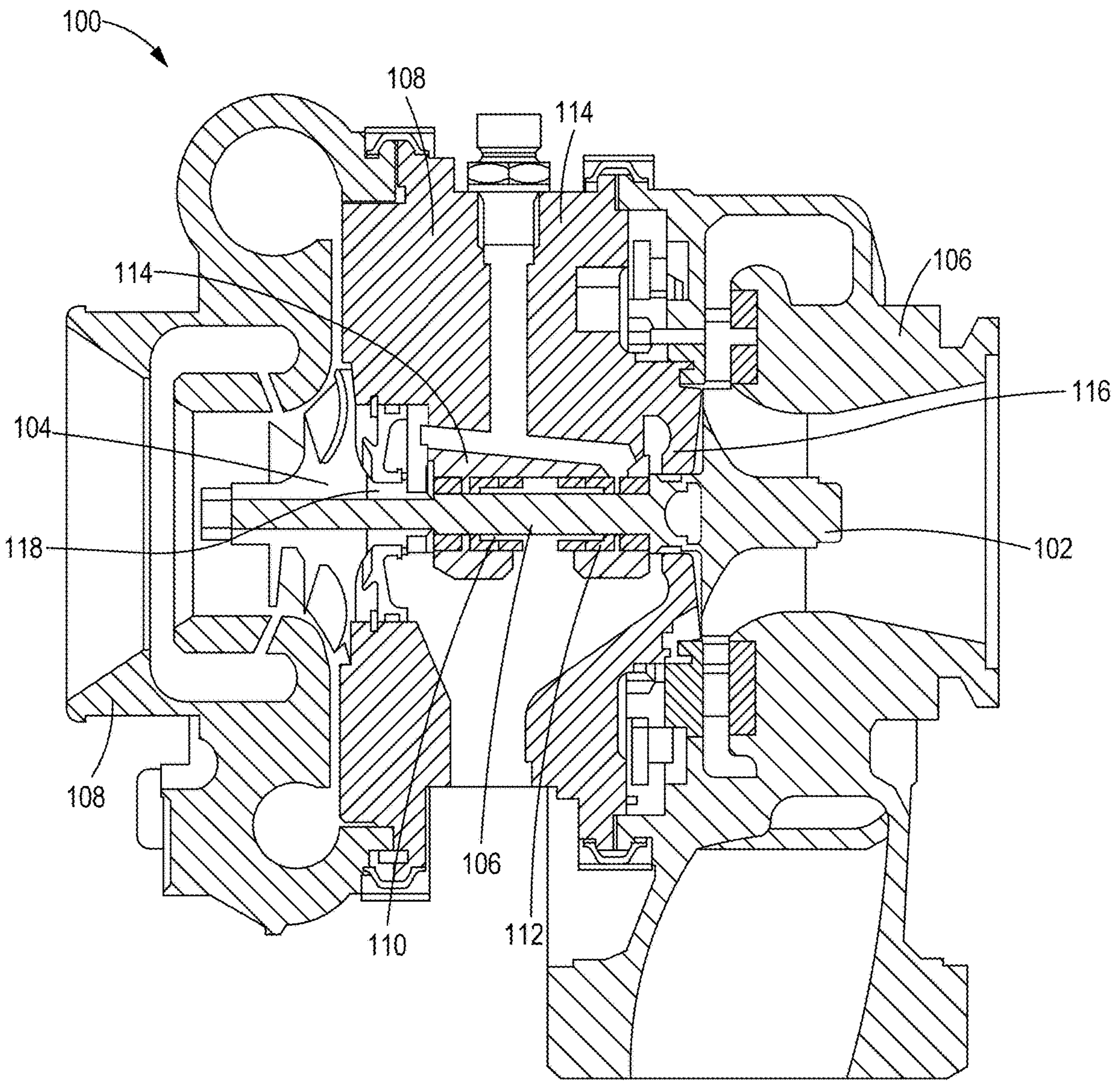
FIG. 2 is a cross-section of a turbocharger of FIG. 1 taken along line 2-2, according to one embodiment of the disclosure.
Figure 3:
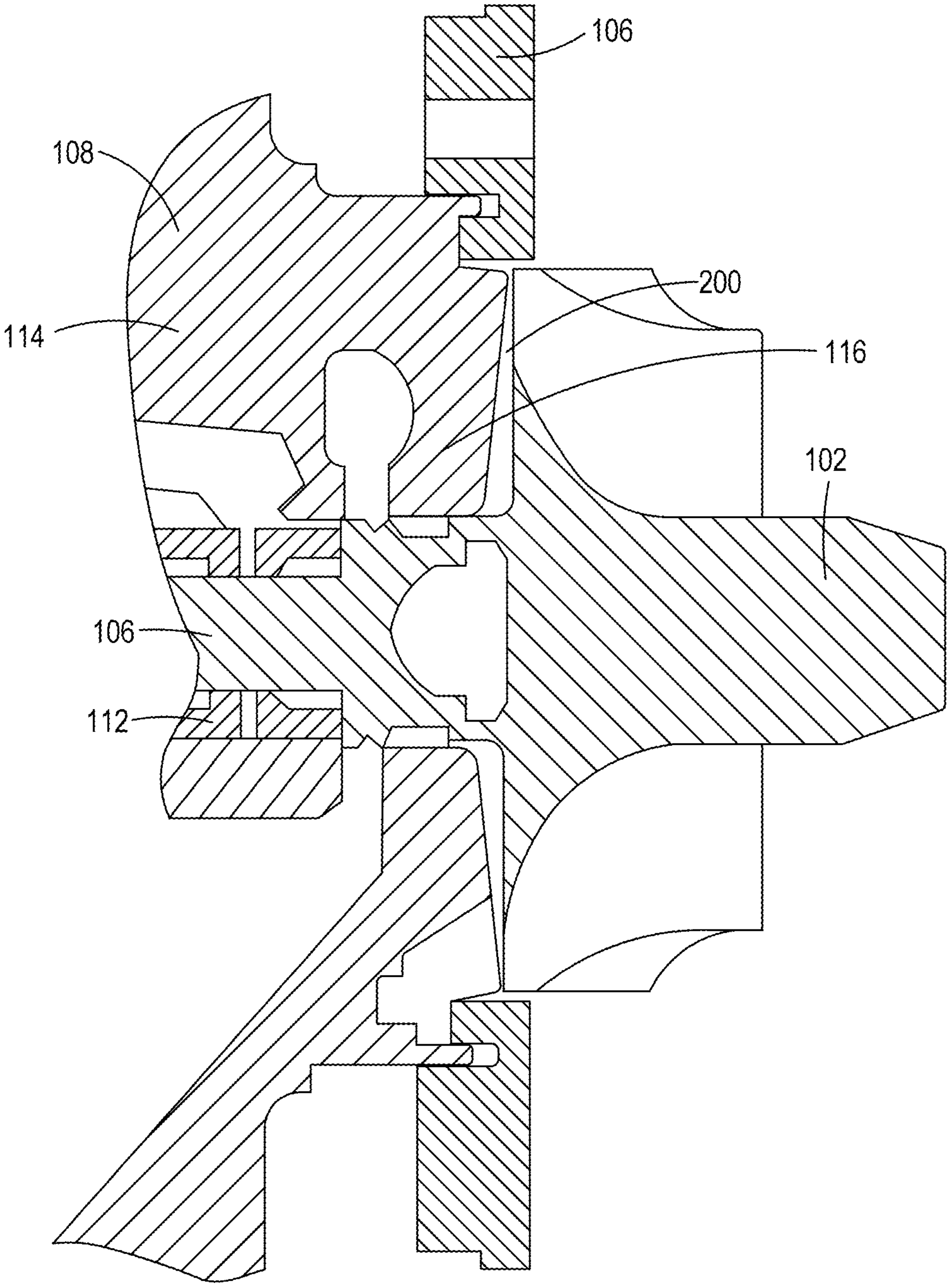
FIG. 3 is a cross-section of the turbocharger of FIG. 2 in an area around a turbine wheel, according to one embodiment of the disclosure.
Figure 4:
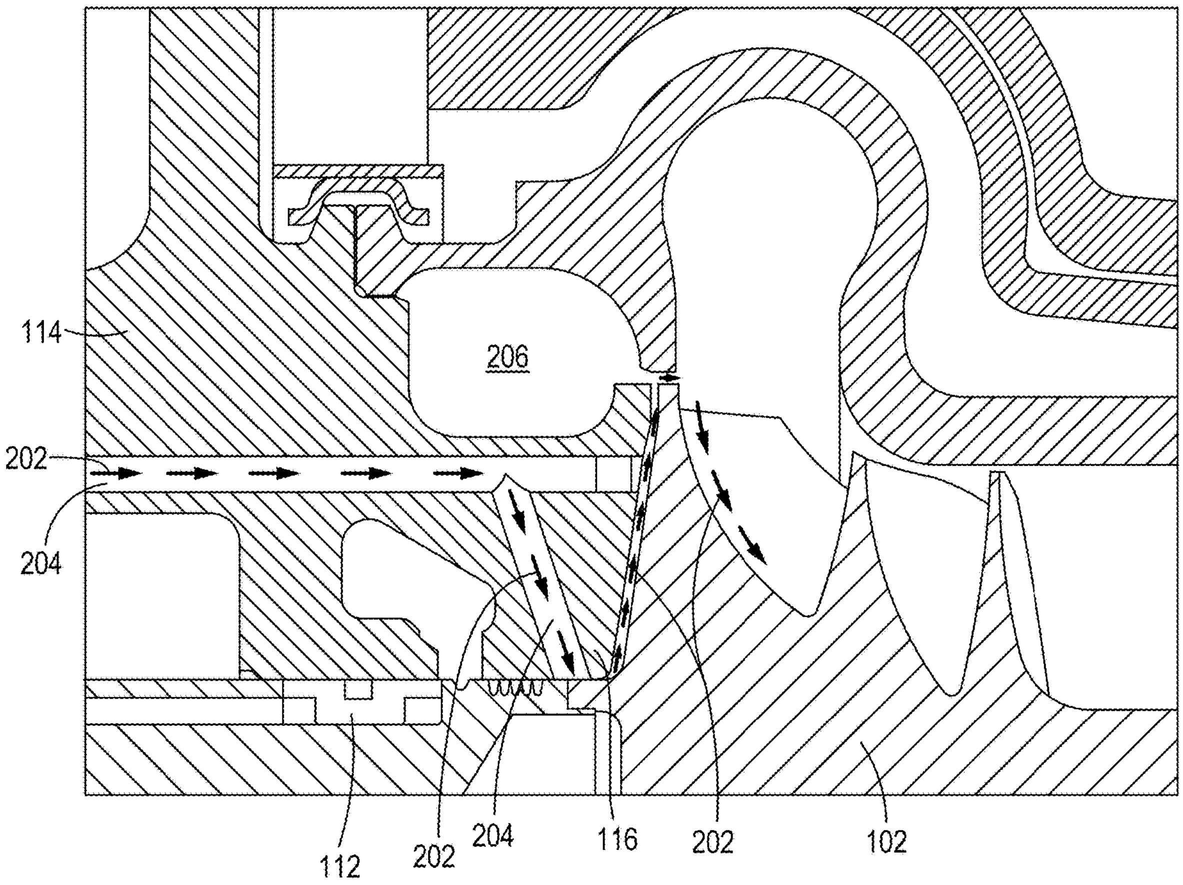
FIG. 4 is a cross-section of the turbocharger of FIG. 2 in an area around a turbine wheel, according to another embodiment of the disclosure.

Now referring to FIGS. 2-4, a cross-section of the turbocharger 100 of FIG. 1 is illustrated taken along line 2-2, according to one embodiment of the disclosure. As shown in FIG. 2, the shaft 106 may extend through the bearing housing 108 and be rotational mounted within the bearing housing 108 in the shaft bore 110. The shaft 106 may have a plurality of bearings 112 mounted around the shaft 106. The plurality of bearings 112 may include journal bearings and/or ball bearings, as generally known in the arts. The shaft 106, turbine wheel 102, and compressor 104 may rotate at very high speeds, such as in excess of 250,000 rpm. To support the high speed rotations, the plurality of bearings 112 used to support the shaft 106 may be lubricated with oil.

As shown in FIGS. 3-4 in an area around the turbine wheel 102, the bearing housing 108 has a main body 114 extending radially to the turbine wheel 102 with a turbine end 116 formed with a complementary geometry to the turbine wheel 102. The turbine end 116 can be formed in any suitable manner when forming the bearing housing 108, such as by casting, machining, shot peening, and the like. The turbine end 116 extends in a generally radially outward direction relative to an axis of rotation of the shaft 106 taken along line 2-2. The turbine end 116 faces the turbine wheel 102 and is formed to the geometry of a compressor end 118 of the turbine wheel 102 that faces the compressor 104.

The components within the bearing housing 108, such as the set of bearings 112 are protected from unwanted transfer of thermal energy from the exhaust gas in the turbine wheel 102 because the turbine end 116 impedes the conductive and radiative flow of heat from the exhaust gas through the bearing housing 108 back to the compressor end 118. By casting the turbine end 116 to the geometry of the turbine wheel 102, any adverse affects from increases in temperatures within the turbocharger 100 are avoided from heat traveling towards the compressor 104 and affecting components within the turbocharger 100. The turbine end 116 also impedes the flow of heat from the exhaust gas to the seal rings, piston rings, and the plurality of bearings 112. The turbine end 116 of the bearing housing 108 is a heat shield formed unitarily with the bearing housing 108.

The turbine end 116 can have various configurations as necessary to be complementary to the geometry of the turbine wheel 102. For instance, the bearing housing 108 may have a generally disc-shaped structure without a flange. When the turbine end 116 is complementary to the turbine wheel 102, the complementary geometry permits a uniform tolerance stack-up removing a volume of unwanted airgaps that cause unwanted airflow circulation and air buildups within the turbocharger 100. The turbine end 116 may be formed with the complementary geometry to form an exit airgap 200 from the tolerance stack-up formed after assembly between the turbine end 116 and the turbine wheel 102 to promote an exhaust airflow that cools the turbine wheel 102 and exits the turbocharger 100. The exit airgap 200 allows for cooling air to be actively present between the turbine wheel 102 and the turbine end 116, allowing for the removal of a separate heat shield attached to the bearing housing 108. The turbine end 116 is machined or casted while controlling the complementary geometry to control the tolerance and gaps between the turbine end 116 and the turbine wheel 102. By controlling the tolerance gap between the turbine end 116 and the turbine wheel 102, cooling air is enabled in the exit airgap 200 thereby removing the need for coupling a separate heat shield to the bearing housing 108. The cooling air actively present in the exit airgap 200 acts as a heat shield improving cooling of the turbine wheel 102 and also removing the need for a secondary heat shield coupled to the bearing housing 108.

The turbine end 116 may be at least partially covered with a thermal insulating material, such as a ceramic fibers, heat-resistant fabrics, metal foils, composite materials, and thermal barrier coatings (TBC). The thermal insulating material can include, for example, Metal-Matrix Composites such as aluminum-matrix composites, titanium diboride, aluminum oxide, alumina-silica, boron nitride, silicon carbide, vitrium oxide, YSZ (yttria-stabilized zirconia), gadolinium zirconate, MCrAlY coatings plasma-sprayed TBCs, electron-beam physical vapor deposition (EB-PVD) TBCs, and zirconium oxide.

The oil used to lubricate the plurality of bearings 112 may also be susceptible to breakdown and coking if operating temperatures become too extreme within the turbocharger 100. The turbocharger 100 may utilize the bearing housing 108 to restrict heat from the exhaust gas from flowing within the bearing housing 108 from the turbine wheel 102 towards the compressor 104. The exhaust gas in an engine or power generator can range in temperatures from 740° C. to 1050° C., depending upon the fuel used, such as gasoline, diesel, ethanol, and the like.

Referring to FIG. 4, an air flow 202 is illustrated exiting the bearing housing 108, according to one embodiment of the disclosure. By extending the bearing housing 108 to the turbine end 116 and forming the turbine end 116 to the geometry of the turbine wheel 102, suboptimal airflows are prevented and avoided because the tolerance stack-up formed after assembly between the bearing housing 108 and the turbine wheel 102 creates less airgaps and/or air buildup. By extending the bearing housing 108 to the turbine end 116 and forming the turbine end 116 to the geometry of the turbine wheel 102, the air flow 202 may exit the turbocharger 100 with a more uniform flow which may provide improved cooling of the turbine wheel 102. The air flow 202 may be high pressure air that acts a sealant that prevents oil from escaping the bearing housing 108, while also providing cooling air to the turbine wheel 102 and the turbine end 116. The cooling air from the air flow 202 in the exit airgap 200 acts as a heat shield.

The air flow 202 in the bearing housing 108 of the turbocharger 100 is formed through a combination of natural convection and forced convection. Natural convection occurs as heated air rises, creating a flow within an at least one passage 204 within the bearing housing 108. The at least one passage 204 may be provided in the bearing housing 108 to allow fluid communication with the exit airgap 200 to exit the turbocharger 100. The at least one passage 204 serves as an exit path from the bearing housing 108 to the exit airgap 200.

In one embodiment, the at least one passage 204 may be distributed in any suitable manner, such as equally or unequally spaced circumferential slots. The at least one passage 204 can extend through the turbine end 116 or through a portion of the bearing housing 108. The at least one passage 204 can have various orientations, parallel, perpendicular, or at any suitable angle relative to axis of the shaft 106, shown by the 2-2 line. The at least one passage 204 can be optimized in multiple radial positions to achieve ideal pressure ratios. The at least one passage 204 can be formed by casting and/or machining.

The air flow 202 directed by at least one passage 204 towards the turbine wheel 102, can recirculate in a chamber 206 in the bearing housing 108. The chamber 206 may be formed when casting or machining the bearing housing 108. The air flow 202 of exhaust gas may enter the chamber 206 and flows towards at least one passage 204 and/or the exit airgap 200, where it exits the chamber 206. The recirculation of exhaust gas within the chamber 206 may facilitate airflow, vortex flow, and/or pressure within the bearing housing 108 for an increased exit flow. The increase in pressure may facilitate air flow between the turbine end 116 and the turbine wheel 102, thereby cooling the turbine wheel 102.

Figure 5:
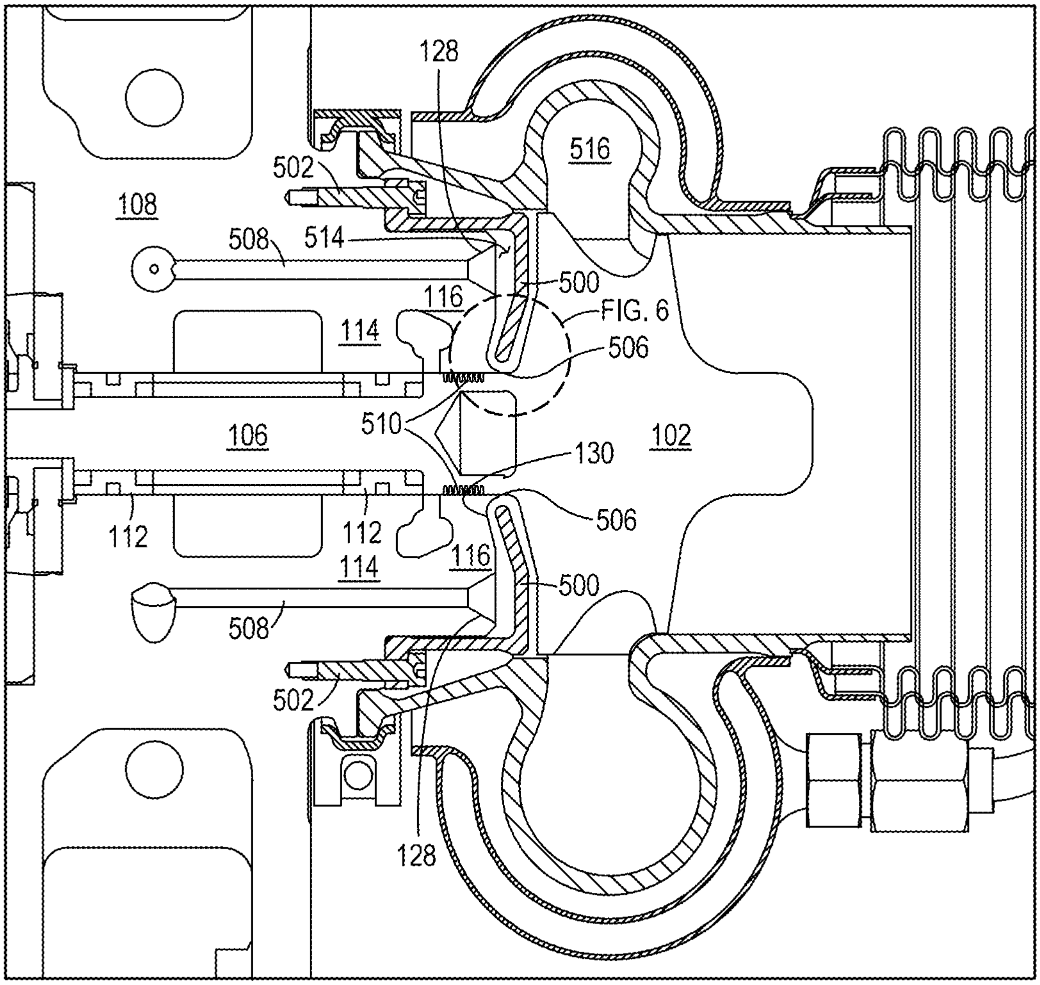
FIG. 5 is a cross-section of a turbocharger of FIG. 1 taken along line 2-2, according to another embodiment of the disclosure

Referring now to FIG. 5, a cross-sectional view of the turbocharger 100 is illustrated according to another embodiment of the disclosure. FIG. 5 displays the turbine wheel 102 as shown in FIG. 2, presented with design modifications according to another embodiment of the disclosure. This embodiment illustrates a modified cooling system where a cross-drill from each supply path is omitted. A heat shield 500 is affixed onto the main body 114 of the bearing housing 108 via a fastening means such as a bolt 502. The primary function of the heat shield 500 is to block axial supply path outlets, thereby pressurizing the region posterior to the heat shield 500. This configuration channels the cooling airflow around the inboard tip 506 of the heat shield 500, ensuring a homogenized distribution of cooling air across the back-wall of the turbine wheel 102, originating from the outer diameter of the shaft 106.

The heat shield 500 serves as a barrier to protect against direct heat transfer and as a conduit to guide cooling air effectively around its periphery. The design consideration for the heat shield 500 includes its material composition, capable of withstanding high thermal stresses, and its geometric alignment with the turbine wheel 102 to facilitate optimal airflow.

The bolt 502, utilized for securing the heat shield 500 to the bearing housing 108, is designed for robust attachment, ensuring the heat shield 500's stability during operation. The selection of the bolt 502 material and its threading design are critical for maintaining the structural integrity of the assembly under high-speed rotational forces and thermal expansion.

Figure 22:
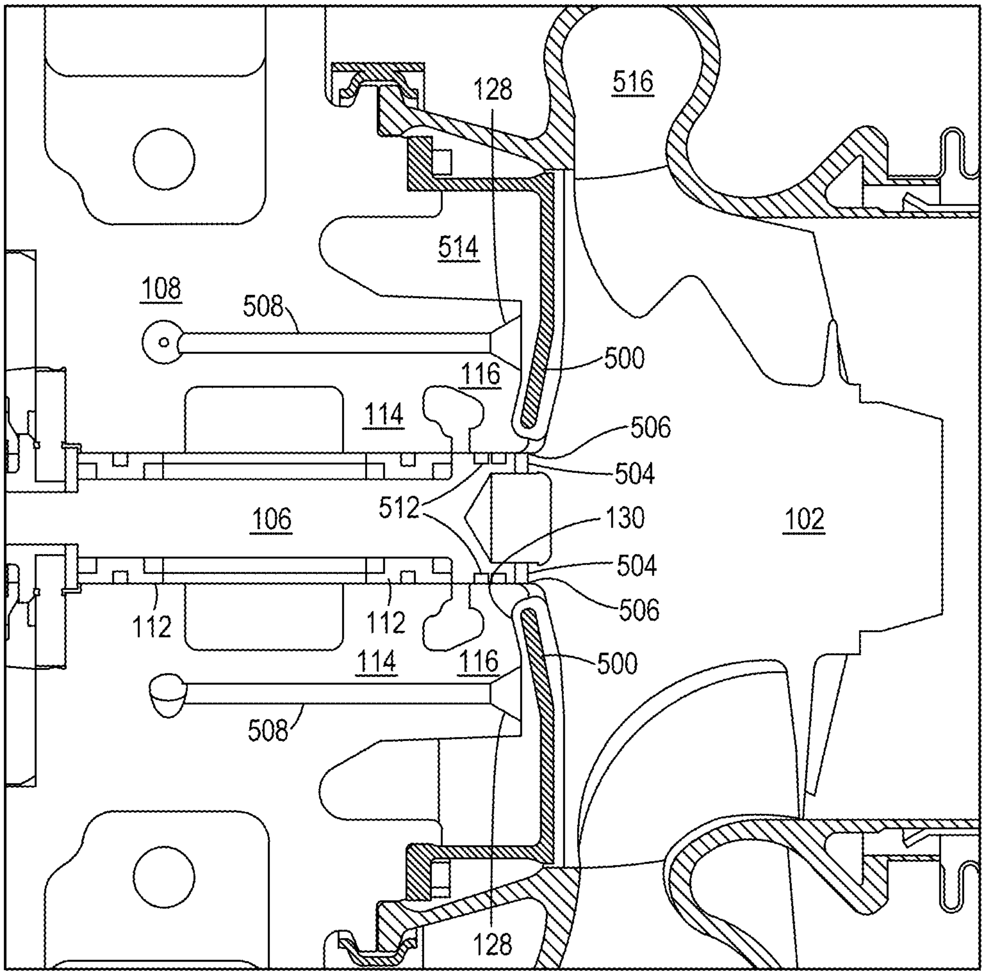
FIG. 22 is a cross-section of a turbocharger of FIG. 1, according to another embodiment of the disclosure.

Referring to FIGS. 5 and 22, a labyrinth seal 510 and/or a ring seal 512 are incorporated to enhance the sealing efficiency between the shaft and the bore proximate to the first end of the bearing housing. The labyrinth seal 510, positioned between the shaft and the bore, includes multiple teeth arranged in a series of stages to create a tortuous path for the air. This design minimizes the leakage of air and enhances the sealing efficiency. The labyrinth seal 510 is strategically placed in the high-pressure stage of the turbine, where it effectively manages the pressure differential between the first volume 514 and the second volume 516. By utilizing multiple teeth, the labyrinth seal 510 ensures that any air attempting to bypass the seal is throttled and dissipated across each stage, thereby significantly reducing the overall leakage.

The ring seal 512, often referred to as a piston ring seal, is utilized in the low-pressure stage of the turbine. This seal comprises one or two piston rings that provide an additional sealing mechanism between the shaft and the bore. The ring seal 512 is designed to handle lower pressure differentials and complements the function of the labyrinth seal 510 by providing an initial barrier against air leakage. The ring seal 512 is located further downstream in the sealing arrangement, ensuring that any residual air bypassing the labyrinth seal 510 is effectively sealed off.

The combination of the labyrinth seal 510 and ring seal 512 provides a robust sealing system for the radial turbine. The high-pressure stage managed by the labyrinth seal 510 ensures minimal air leakage by creating multiple barriers for the air to traverse. The subsequent ring seal 512 acts as a secondary sealing mechanism, providing additional security against any air that might bypass the labyrinth seal 510. This dual-seal approach ensures optimal performance of the turbine by maintaining the necessary pressure differentials between the first volume 514 and the second volume 516.

During operation, air is directed from the first volume 514 around the heat shield and away from the labyrinth seal 510, minimizing the amount of air passing the seal and ensuring efficient sealing. The design of the bearing housing with a rounded edge at the first end further assists in directing the air away from the sealing features, thus enhancing the longevity and efficiency of both the labyrinth seal 510 and ring seal 512.

By employing these advanced sealing techniques, the radial turbine achieves improved performance, reduced air leakage, and enhanced durability of the sealing components, thereby contributing to the overall efficiency and reliability of the turbocharger system.

Attached to the main body of the bearing housing 108 is the heat shield 500, which includes a portion disposed between the main body of the bearing housing 108 and the turbine wheel 102. The heat shield 500 has an opening that is coaxial with the shaft bore 110, allowing a portion of the shaft 106 to pass through. The heat shield 500 defines a first volume 514 between the bearing housing 108 and the heat shield 102, and a second volume 516 between the heat shield 500 and the turbine wheel 102. The first volume 514 and second volume 516 are in fluid communication via a radial gap 124 between a portion of the heat shield 500 and the shaft 106. The bearing housing 122 includes at least one cooling channel 508 which acts as an at least one air passageway that communicates with the first volume 514. During operation, air flows from the at least one cooling channel 508 into the first volume 514 and subsequently into the second volume 516. The air passageway may include a flared portion 128 near the heat shield 500, where the cross-sectional area increases to a maximum.

A first end of the bearing housing 108 may include a recessed portion 130, which is disposed radially outboard of the shaft bore 110 and inboard of the cooling channel 508. This recessed portion 130 has a curved profile, increasing the axial dimension of bearing housing 108 toward the turbine wheel 102 at decreasing radial distances. Additionally, a first portion of the bearing housing 108 has a rounded cross-sectional profile at the opening 120. The heat shield 500 includes a first surface facing the first volume 514 and a second surface facing the second volume 516, with the rounded cross-sectional profile of the inboard tip 506 defining a semicircular cross-section connecting the first and second surfaces of the heat shield 500. Referring now to FIG. 22, interface 504 depicts the overlapping region where the shaft 104 and the turbine wheel 102 are joined. The interface 504 is designed with an interference fit, ensuring a tight connection. The parts are friction welded, creating a strong, reliable bond capable of withstanding the high-speed rotation and significant forces encountered during operation. The interference fit and friction welding ensure no relative motion between the shaft and the turbine wheel, maintaining alignment and enhancing the system's durability.

Figure 6:
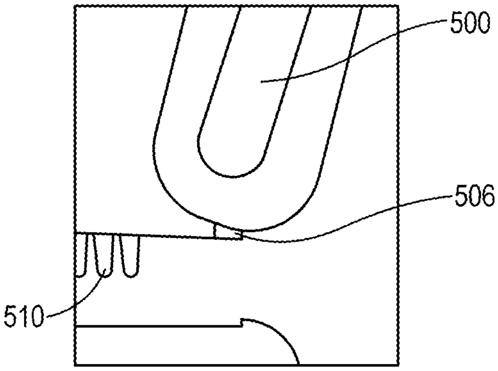
FIG. 6 is a close-up view of a heat shield from FIG. 5, according to another embodiment of the disclosure.

Referring now to FIG. 6, is a close up of the inboard tip 506 is illustrated, according to another embodiment of the disclosure. The inboard tip 506 of the heat shield 500 is specifically contoured to direct cooling air with minimal resistance, promoting an efficient flow path around the heat shield 500 and towards the cooling channels 508. The shape of the inboard tip 506 is engineered to ensure a smooth transition of airflow, reducing turbulence and enhancing the cooling effectiveness.

The cooling channels 508 are designed to distribute the cooling air uniformly across the turbine wheel 102's backwall. The configuration and orientation of these channels are critical for achieving an even thermal gradient across the turbine wheel 102, mitigating hot spots and enhancing the component's longevity.

Figure 7:
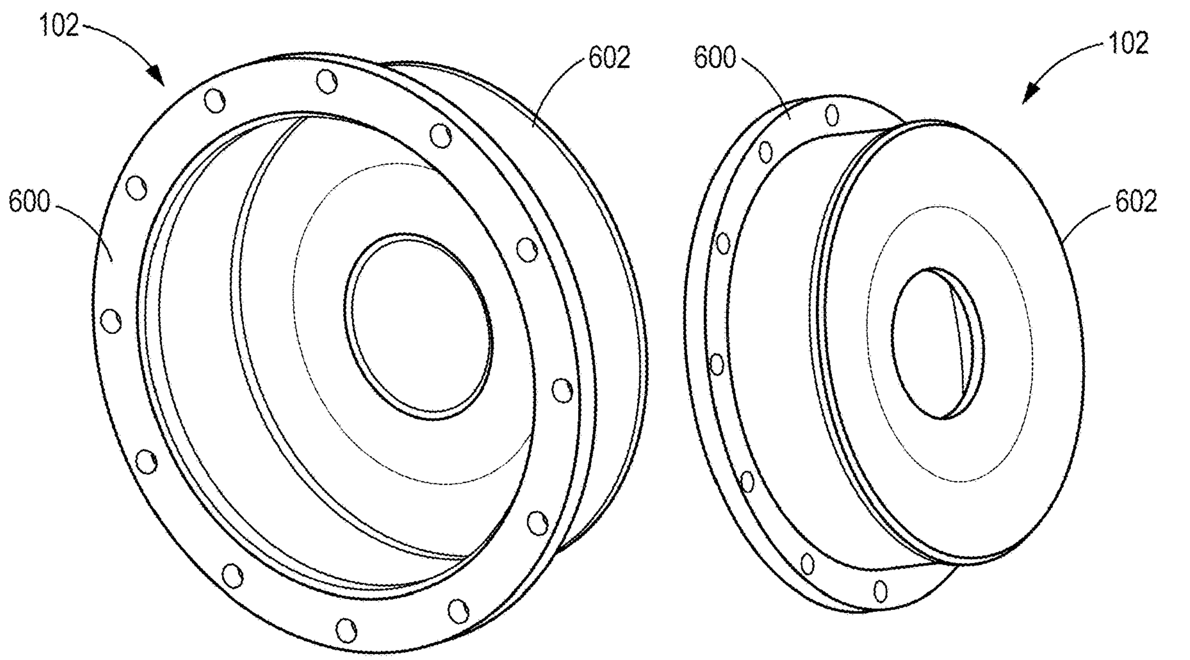
FIG. 7 is a perspective view of a turbine wheel, according to one embodiment of the disclosure.
Figure 8:
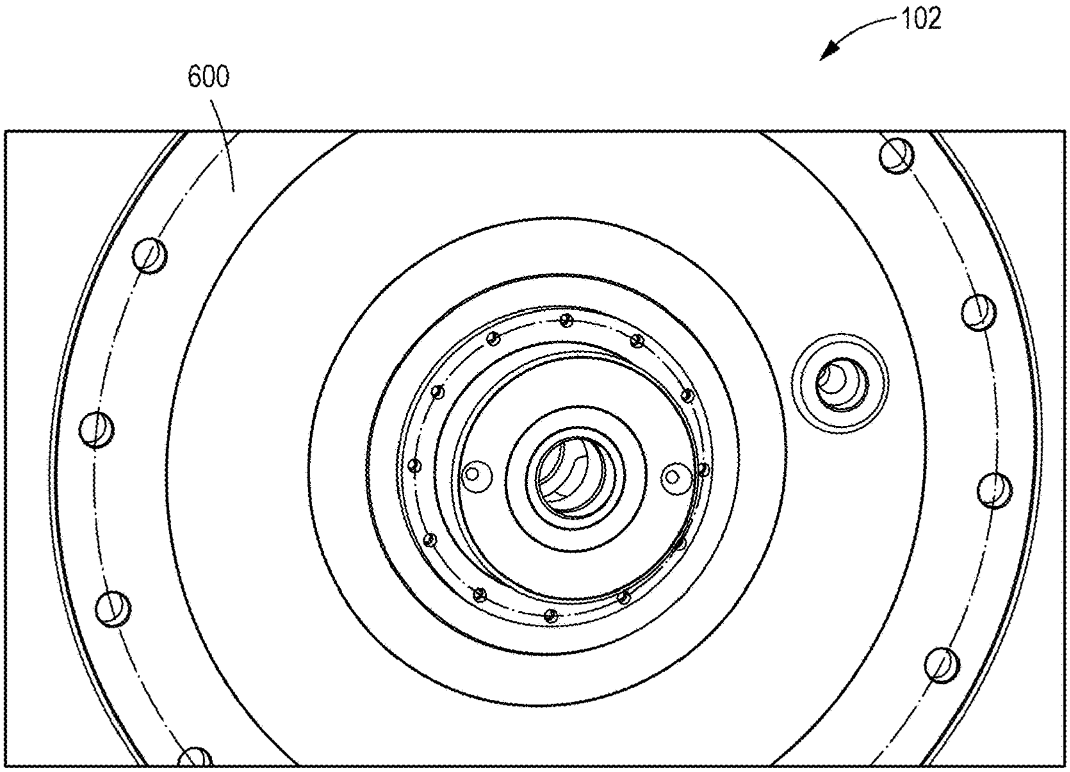
FIG. 8 is a front view of a turbine wheel, according to one embodiment of the disclosure.

Referring now to FIGS. 7-8, the turbine wheel 102 is illustrated, according to an embodiment of the disclosure. In FIGS. 7 and 8, the general shape of the turbine wheel 102 is presented, illustrating its aerodynamic profile designed to convert exhaust gas energy into rotational energy efficiently. The turbine wheel 102 may comprise multiple blades, each engineered to maximize the conversion of thermal and kinetic energy from the exhaust gases into mechanical energy. The geometric design of the turbine wheel 102, including the curvature and angle of the blades, is optimized for performance across a wide range of operational conditions, balancing efficiency with durability.

While the following detailed description describes an exemplary aspect in connection with the turbocharger, it should be appreciated that the description applies equally to the use of the present disclosure in other applications including but not limited to gasoline generators, diesel generators, intercooled & recuperated power generators, rotary engines, gasoline combustion engines, and/or diesel engines employed in various automobiles, cars, trucks, SUVs, CSUVs, sport vehicles, racing vehicles, and other similar power generators and vehicles.

Figure 10:
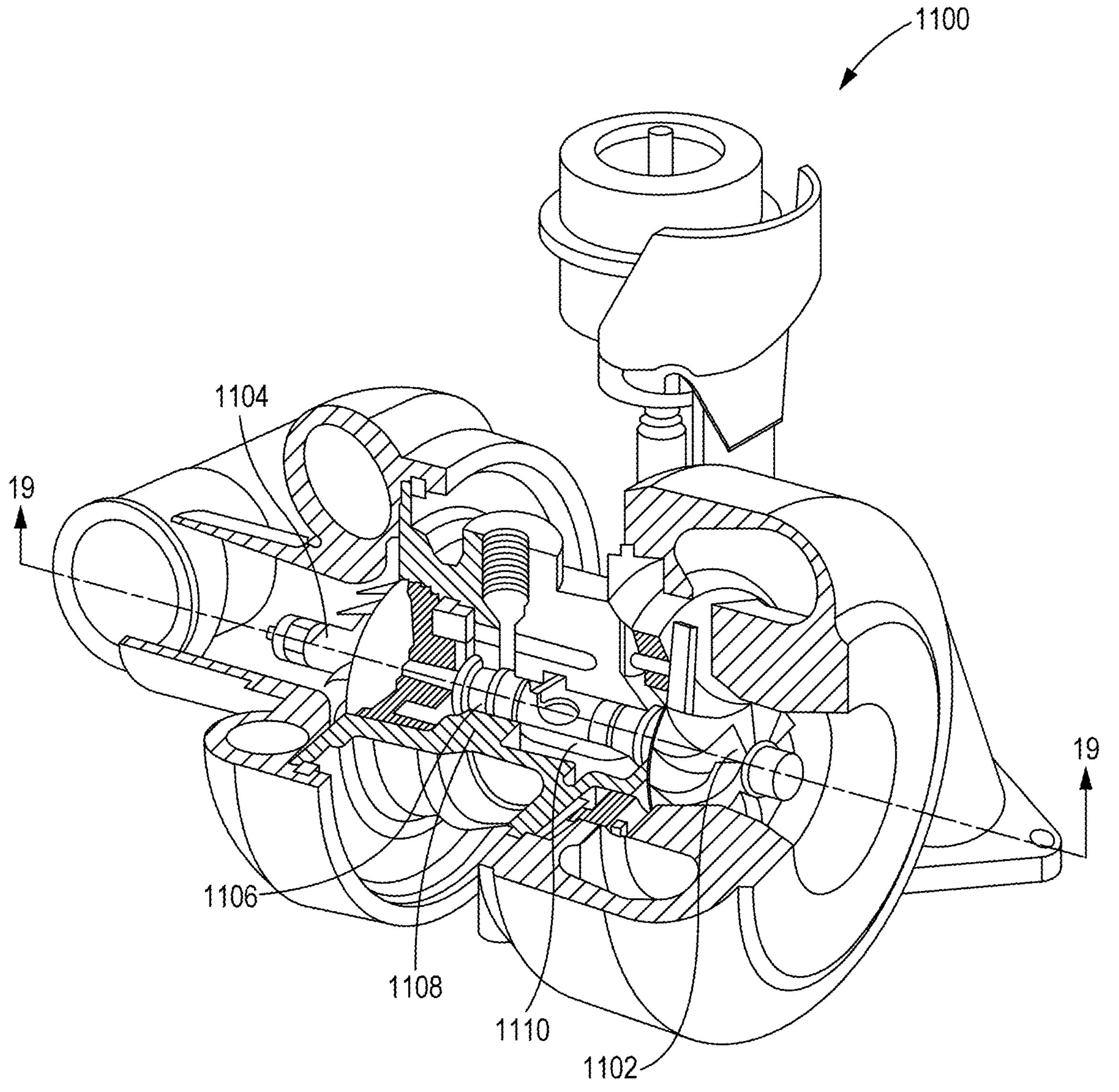
FIG. 10 is a perspective cut-away view of a turbocharger in accordance with an embodiment of the present disclosure.

In another embodiment, as can be seen in FIG. 10, a turbocharger 1100 includes a turbine wheel 1102, a compressor wheel 1104 and a shaft 1106 for rotatably coupling the turbine wheel 1102 and the compressor wheel 1104. The shaft 1106 extends through a center housing 1108. The turbine wheel 1102 may be located within a turbine housing, and the compressor wheel 1104 may be located in a compressor housing, as generally known in the arts. The shaft 1106 may be provided in a shaft bore 1110 in the center housing 1108.

The turbine wheel 1102 may be rotationally driven by exhaust gas exiting the turbocharger 1100. The rotation of the turbine wheel 1102 is communicated to the compressor wheel 1104 by the shaft 1106. The compressor wheel 1104 may be used to increase the pressure of intake air prior to the air mixing with fuel for combustion in an engine or power generator. The rotation of the turbine wheel 1102 creates a forced vortex, where the particle velocity and pressure change proportionally to the radius of rotation.

Figure 11:
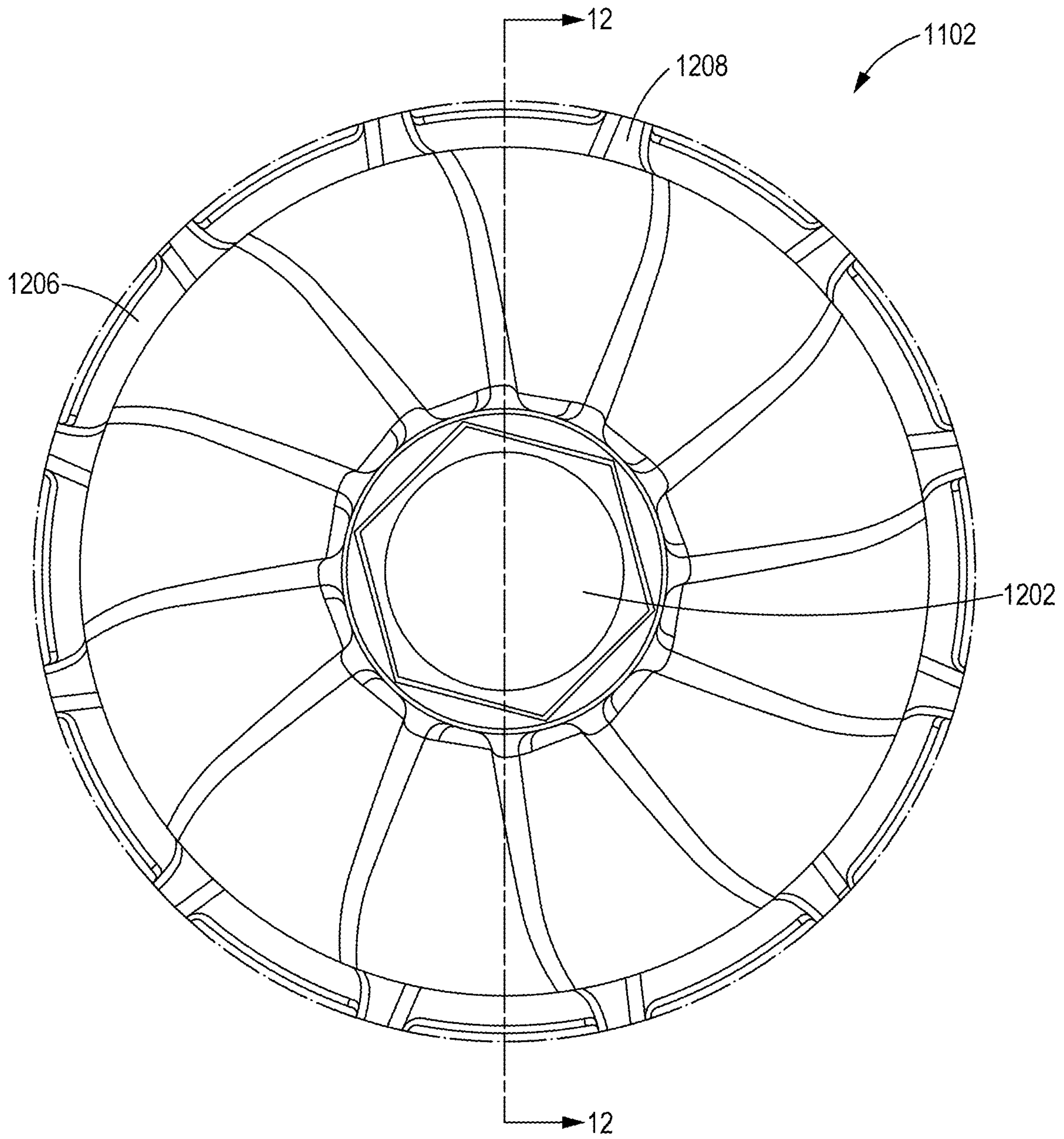
FIG. 11 is a front view of a turbine wheel in accordance with an embodiment of the present disclosure.
Figure 12:
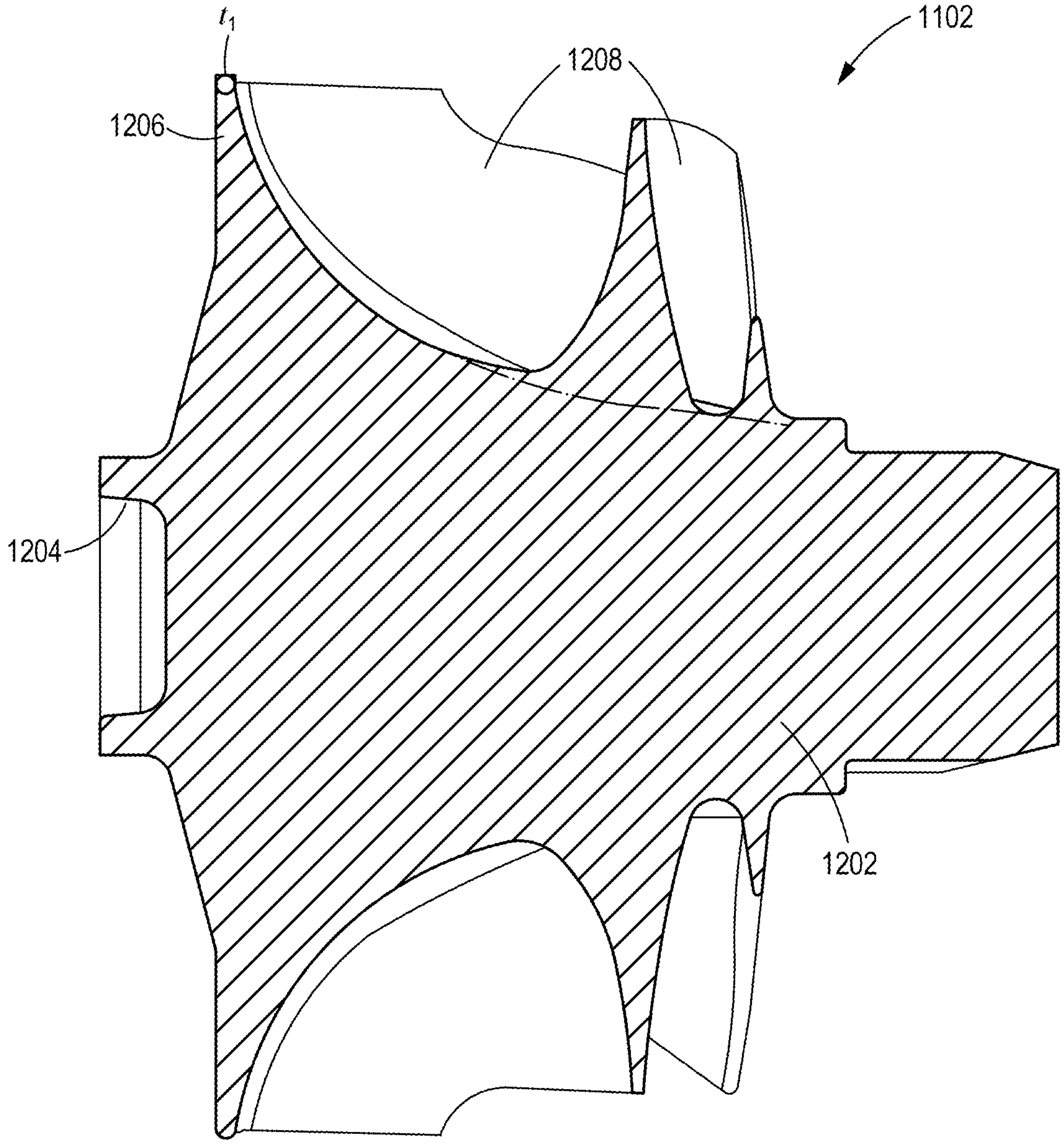
FIG. 12 is a cross-sectional view of a turbine wheel taken along line 12-12 of FIG. 11 and constructed in accordance with the present disclosure.
Figure 13:
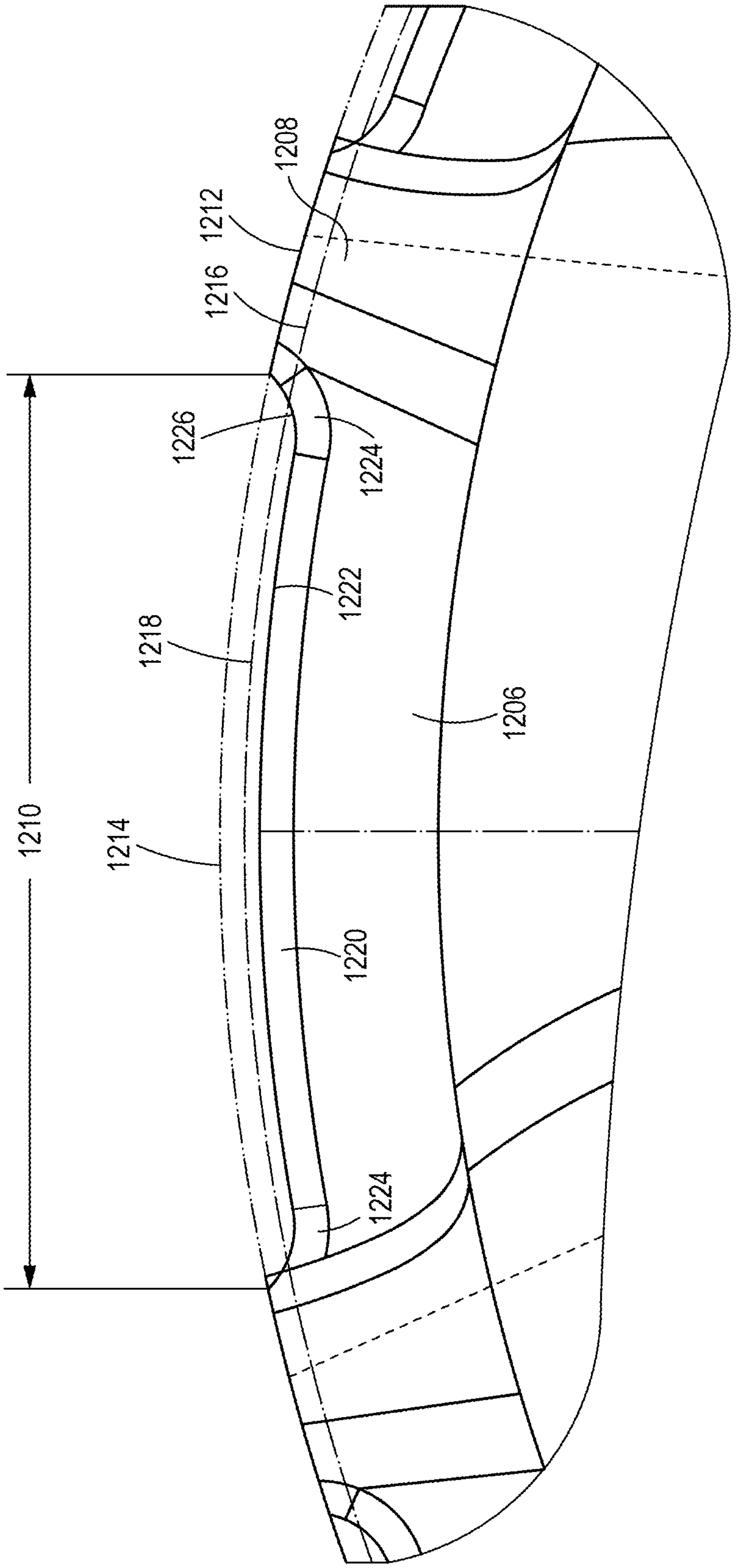
FIG. 13 is an enlarged view of FIG. 11, showing the turbine wheel in greater detail, constructed in accordance with the present disclosure.

An exemplary embodiment of the turbine wheel 1102 is shown schematically in a front view in FIG. 11, and shown schematically in a cross-sectional view in FIG. 12, taken along line 12-12 of FIG. 11. The turbine wheel 1102 may be formed through a casting process and may be attached to the shaft 1106 at one end through a shaft attachment zone 1204. The turbine wheel 1102 may form a turbine wheel body 1202 with a back wall 1206 at the end of the turbine wheel body 1202 proximate the shaft attachment zone 1204. As shown in FIGS. 12-13 the back wall 1206 of the turbine wheel 1102 is formed as a disk with a back wall end thickness ti. The turbine wheel 1102 may include a plurality of blades 1208 for interacting with exhaust gasses from an engine and drive rotation of the shaft.

FIG. 13 illustrates detail of the turbine wheel 1102. Each of the plurality of blades 1208 may have a blade width 1210 representing the spacing between each of the plurality of blades 1208. The blade width 1210 may be constant, and thus the plurality of blades 1208 is spaced evenly about the surface of the back wall 1206, or the blade width 1210 may vary between ones of the plurality of blades 1208. As the turbine wheel 1102 is cast, the back wall 1206 and the plurality of blades 1208 may have a casting surface 1212 at a casting diameter 1214. The turbine wheel 1102 is located in an area with tight gaps. Casting tolerances can be high and thus, in order to form a uniform surface to clearance the turbine wheel 1102 as well as provide balancing and a surface with minimal air resistance, the casting surface 1212 may be ground down to a machined surface 1216 having a constant diameter represented by a machined diameter 1218. As a result of grinding the plurality of blades 1208, a blade zone represented by the machined surface 1216 on each of the plurality of blades 1208 may be formed having a blade diameter at the machined diameter 1218.

Figure 19:
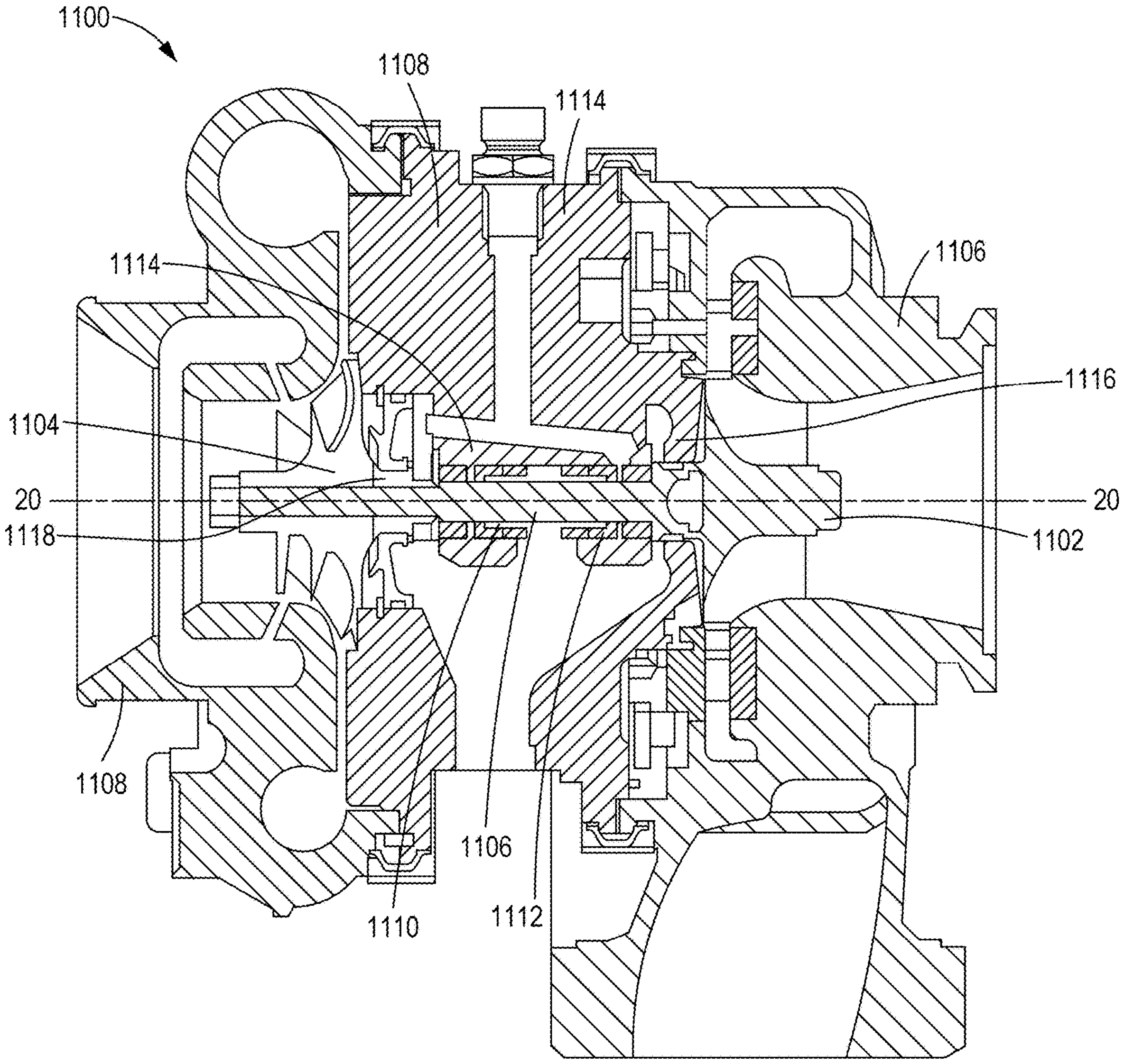
FIG. 19 is a cross-section view of the turbocharger of FIG. 10 taken along line 19-19, constructed in accordance with the present disclosure.

In the casting process, scallops may be formed into the back wall 1206 of the turbine wheel 1102, represented in FIG. 13 by a scallop zone 1220. In order to provide a smooth transition between the scallop zone 1220 and the blade zone formed by the machined surface 1216, a transition zone 1224 may also be provided by the casting process at each end of the scallop zone 1220 as it transitions back into blades of the plurality of blades 1208. The transition zone may include progressive rounding from the scallop zone 1220 into the plurality of blades 1208. The transition zone 1224 may further include casting a portion of the plurality of blades at a transition radius 1226 formed tangential to the scallop zone 1220 at the scallop diameter 1222. FIG. 19 shows the turbine wheel 1102 fully machined with the blade zone formed by the machined surface 1216, the scallop zone 1220, and the transition zone 1224 joining the two.

The scallop zone 1220 may have a constant diameter from the center of the turbine wheel 1102 represented by a scallop diameter 1222. The scallop diameter 1222 may be nominally smaller than the machined diameter 1218 such that the scallop zone 1220 forms “mini scallops” as opposed to traditional scallops. For example, the scallop diameter 1222 may be between 98% and 99.6% of the machined diameter 1218. Other percentages are certainly possible. In another example, the scallop diameter 1222 may be nominally smaller than the machined diameter 1218 as a result of predetermined tolerancing in the casting process. In this example, the machined diameter 1218 is predetermined, and an upper limit of a casting tolerance is set such that the scallop diameter 1222 is always smaller than the machined diameter.

Figure 14:
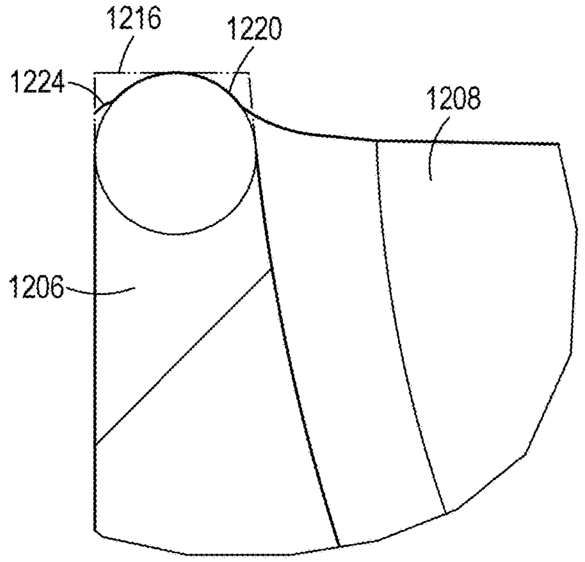
FIG. 14 is an enlarged cross-sectional view of FIG. 12, showing the turbine wheel in greater detail, constructed in accordance with the present disclosure.
Figure 15:
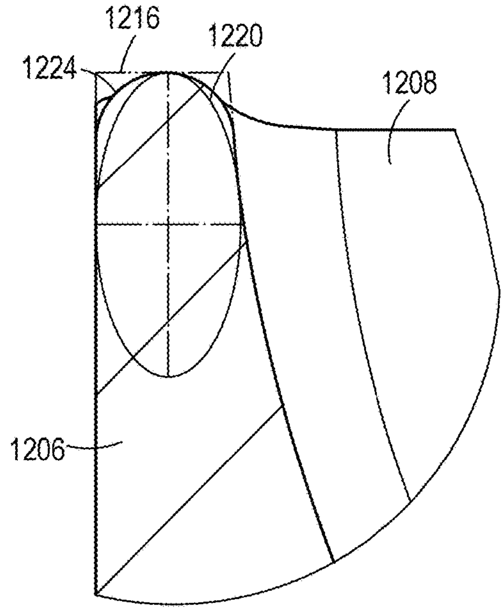
FIG. 15 is an enlarged cross-sectional view of FIG. 12, showing an alternate embodiment of the turbine wheel in greater detail, constructed in accordance with the present disclosure.
Figure 16:
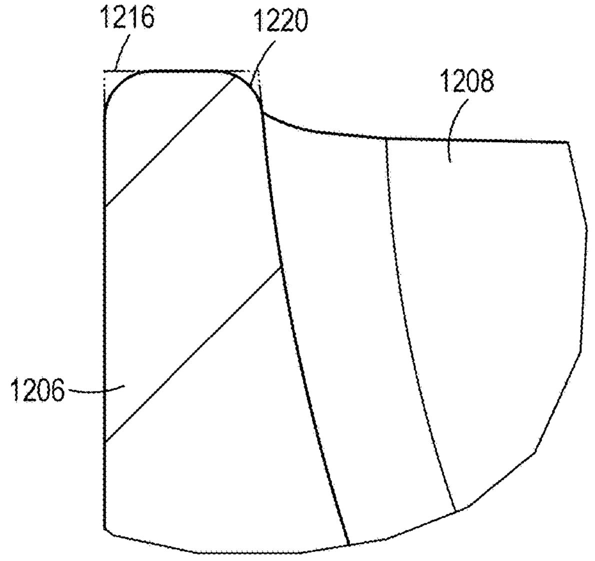
FIG. 16 is an enlarged cross-sectional view of FIG. 12, showing an alternate embodiment of the turbine wheel in greater detail, constructed in accordance with the present disclosure.
Figure 17:
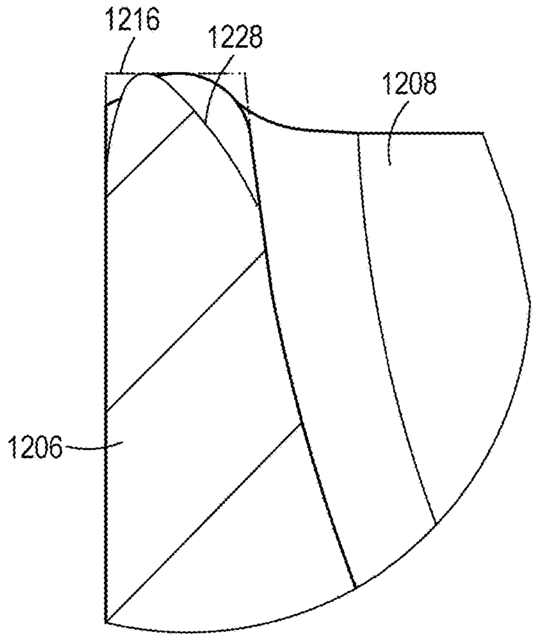
FIG. 17 is an enlarged cross-sectional view of FIG. 12, showing an alternate embodiment of the turbine wheel in greater detail, constructed in accordance with the present disclosure.
Figure 18:
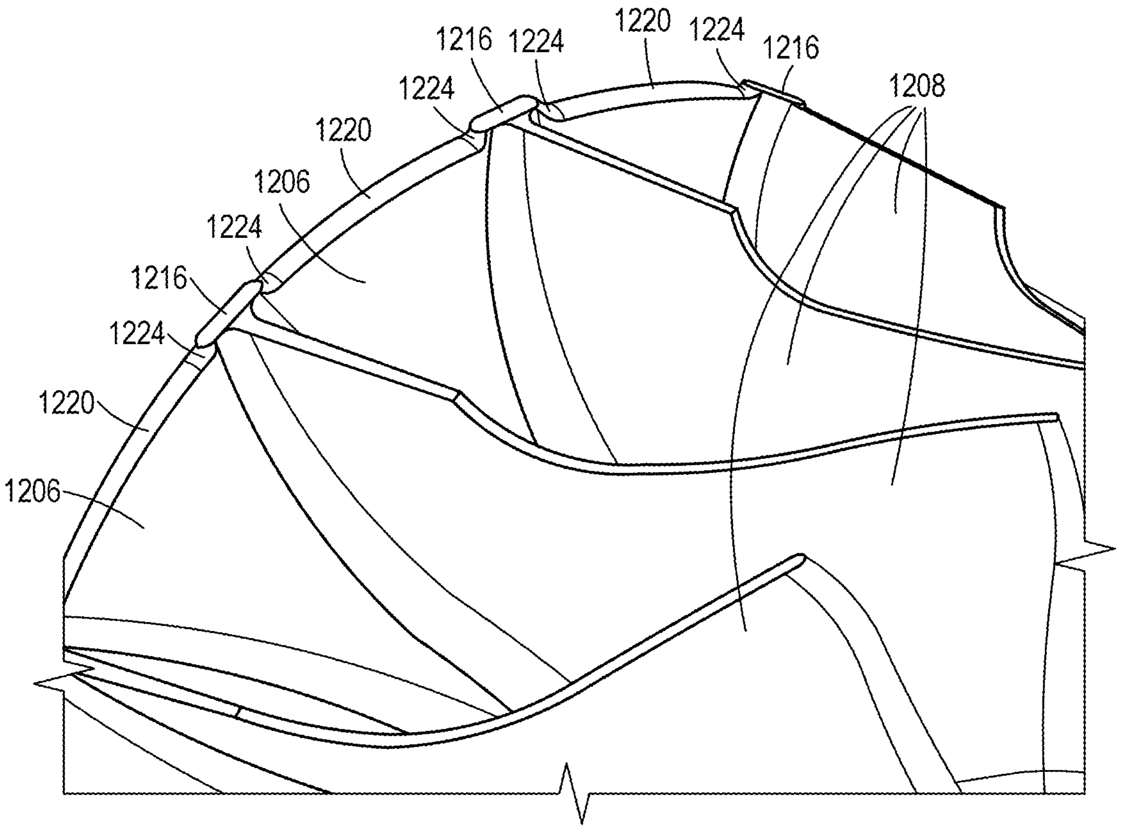
FIG. 18 is a perspective view of the turbine wheel, constructed in accordance with the present disclosure.

The scallop zone 1220 may be rounded with different profiles such that several different embodiments of the turbine wheel 1102 may be formed. In a primary embodiment represented by FIG. 14, the scallop zone 1220 may be fully rounded with a profile of the scallop zone 1220 having a diameter equal to that of the back wall end thickness ti. The rounding of the scallop zone 1220 may have tangential transitions with both surfaces of the back wall 1206. In a second embodiment represented by FIG. 15, the scallop zone 1220 may have a scallop profile having an elliptical profile including tangential transitions with both surfaces of the back wall 1206. In a third embodiment represented by FIG. 16, the scallop zone 1220 may have a three-part scallop profile. The profile of the scallop zone 1220 of FIG. 16 may have a flat portion at the scallop diameter 1222 that is at or near the machined surface 1216, and rounded portions at each end of the flat portion having a radius and forming tangential transitions into the flap portion and the front and back surfaces of the back wall 1206. Finally, in an alternate embodiment represented by FIG. 17, the scallop profile may be defined by a freestyle curve 1228. Other embodiments of the scallop zone 1220 having different scallop profiles may also be implemented.

Figure 20:
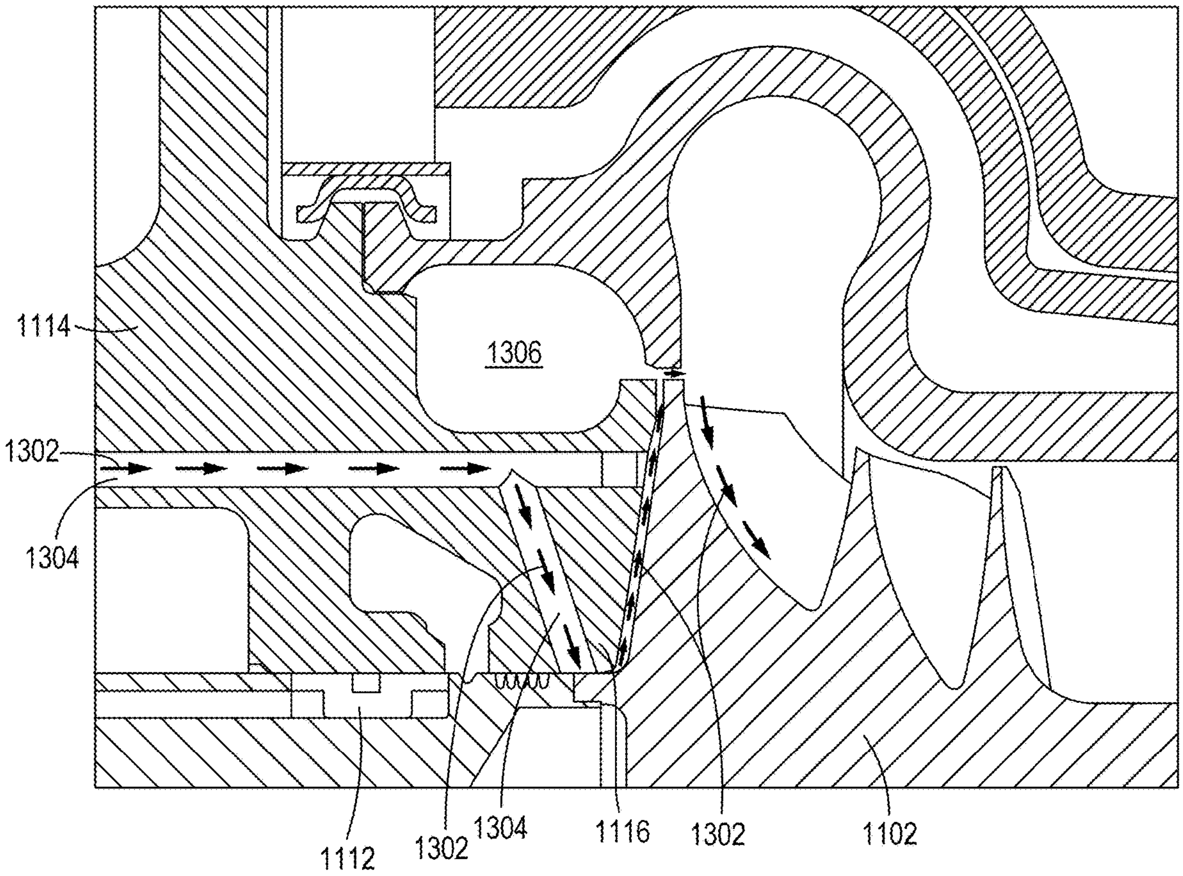
FIG. 20 is a cross-section view of the turbocharger of FIG. 19 in an area around a turbine wheel, constructed in accordance with the present disclosure.

Now referring to FIGS. 19-20, a cross-section of the turbocharger 1100 of FIG. 10 is illustrated taken along line 19-19, according to one embodiment of the disclosure. As shown in FIG. 19, the shaft 1106 may extend through the center housing 1108 and be rotationally mounted within the center housing 1108 in the shaft bore 1110. The shaft 1106 may have a plurality of bearings 1112 mounted around the shaft 1106. The plurality of bearings 1112 may include journal bearings and/or ball bearings, as generally known in the arts. The shaft 1106, the turbine wheel 1102, and the compressor wheel 1104 may rotate at very high speeds, such as in excess of 250,000 rpm. To support the high speed rotations, the plurality of bearings 1112 used to support the shaft 1106 may be lubricated with oil.

As shown in FIGS. 19-20 in an area around the turbine wheel 1102, the center housing 1108 has a main body 1114 extending radially to the turbine wheel 1102 with a turbine end 1116 formed with a complementary geometry to the turbine wheel 1102. The turbine end 1116 can be formed in any suitable manner when forming the center housing 1108, such as by casting, machining, shot peening, and the like. The turbine end 1116 extends in a generally radially outward direction relative to an axis of rotation of the shaft 1106 taken along line 20-20. The turbine end 1116 faces the turbine wheel 1102 and is formed to the geometry of a compressor end 1118 of the turbine wheel 1102 that faces the compressor wheel 1104

The components within the center housing 1108, such as the plurality of bearings 1112 are protected from unwanted transfer of thermal energy from the exhaust gas in the turbine wheel 1102 because the turbine end 1116 impedes the conductive and radiative flow of heat from the exhaust gas through the center housing 1108 back to the compressor end 1118. By casting the turbine end 1116 to the geometry of the turbine wheel 1102, any adverse effects from increases in temperatures within the turbocharger 1100 are avoided from heat traveling towards the compressor wheel 1104 and affecting components within the turbocharger 1100. The turbine end 1116 also impedes the flow of heat from the exhaust gas to the seal rings, piston rings, and the plurality of bearings 1112. The turbine end 1116 of the center housing 1108 is a heat shield formed unitarily with the center housing 1108.

The turbine end 1116 can have various configurations as necessary to be complementary to the geometry of the turbine wheel 1102. For instance, the center housing 1108 may have a generally disc-shaped structure without a flange. When the turbine end 1116 is complementary to the turbine wheel 1102, the complementary geometry permits a uniform tolerance stack-up removing a volume of unwanted airgaps that cause unwanted airflow circulation and air buildups within the turbocharger 1100.

The turbine end 1116 may be at least partially covered with a thermal insulating material, such as a ceramic fibers, heat-resistant fabrics, metal foils, composite materials, and thermal barrier coatings (TBC). The thermal insulating material can include, for example, Metal-Matrix Composites such as aluminum-matrix composites, titanium diboride, aluminum oxide, alumina-silica, boron nitride, silicon carbide, vitrium oxide, YSZ (yttria-stabilized zirconia), gadolinium zirconate, MCrAlY coatings plasma-sprayed TBCs, electron-beam physical vapor deposition (EB-PVD) TBCs, and zirconium oxide.

The oil used to lubricate the plurality of bearings 1112 may also be susceptible to breakdown and cooking if operating temperatures become too extreme within the turbocharger 1100. The turbocharger 1100 may utilize the center housing 1108 to restrict heat from the exhaust gas from flowing within the center housing 1108 from the turbine wheel 1102 towards the compressor wheel 1104. The exhaust gas in an engine or power generator can range in temperatures from 740° C. to 1050° C., depending upon the fuel used, such as gasoline, diesel, ethanol, and the like.

The turbine end 1116 may be formed with the complementary geometry to form an exit airgap 1300 (not pictured) from the tolerance stack-up formed after assembly between the turbine end 1116 and the turbine wheel 1102 to promote an exhaust airflow that cools the turbine wheel 1102 and exits the turbocharger 1100. The exit airgap 1300 allows for cooling air to be actively present between the turbine wheel 1102 and the turbine end 1116, allowing for the removal of a separate heat shield attached to the center housing 1108. The turbine end 1116 is machined or casted while controlling the complementary geometry to control the tolerance and gaps between the turbine end 1116 and the turbine wheel 1102. By controlling the tolerance gap between the turbine end 1116 and the turbine wheel 1102, cooling air is enabled in the exit airgap 1300 thereby removing the need for coupling a separate heat shield to the turbocharger 1100. The cooling air actively present in the exit airgap 1300 acts as a heat shield improving cooling of the turbine wheel 1102 and also removing the need for a secondary heat shield coupled to the center housing 1108.

Referring to FIG. 20, an air flow 1302 is illustrated exiting the center housing 1108, according to one embodiment of the disclosure. By extending the center housing 1108 to the turbine end 1116 and forming the turbine end 1116 to the geometry of the turbine wheel 1102, suboptimal airflows are prevented and avoided because the tolerance stack-up formed after assembly between the center housing 1108 and the turbine wheel 1102 creates less airgaps and/or air buildup. By extending the center housing 1108 to the turbine end 1116 and forming the turbine end 1116 to the geometry of the turbine wheel 1102, the air flow 1302 may exit the turbocharger 1100 with a more uniform flow which may provide improved cooling of the turbine wheel 1102. The air flow 1302 may be high pressure air that acts a sealant that prevents oil from escaping the center housing 1108, while also providing cooling air to the turbine wheel 1102 and the turbine end 1116. The cooling air from the air flow 1302 in the exit airgap 1300 acts as a heat shield.

The air flow 1302 in the center housing 1108 of the turbocharger 1100 is formed through a combination of natural convection and forced convection. Natural convection occurs as heated air rises, creating a flow within an at least one passage 1304 within the center housing 1108. The at least one passage 1304 may be provided in the center housing 1108 to allow fluid communication with the exit airgap 1300 to exit the turbocharger 1100. The at least one passage 1304 serves as an exit path from the center housing 1108 to the exit airgap 1300.

As shown in FIG. 20, the air flow 1302 may be directed behind the turbine wheel 1102 and up a back surface of the back wall 1206. The air flow 1302 may be directed over the rounded profile of the scallop zone 1220 between the plurality of blades 1208. The air flow 1302 may then be guided onto the turbine wheel body 1202 of the turbine wheel 1102 and may help to promote greater cooling of the turbine wheel 1102.

In one embodiment, the at least one passage 1304 may be distributed in any suitable manner, such as equally or unequally spaced circumferential slots. The at least one passage 1304 can extend through the turbine end 1116 or through a portion of the center housing 1108. The at least one passage 1304 can have various orientations, parallel, perpendicular, or at any suitable angle relative to axis of the shaft 1106, shown by the 20-20 line. The at least one passage 1304 can be optimized in multiple radial positions to achieve ideal pressure ratios. The at least one passage 1304 can be formed by casting and/or machining.

The air flow 1302 directed by the at least one passage 1304 towards the turbine wheel 1102, can recirculate in a chamber 1306 in the center housing 1108. The chamber 1306 may be formed when casting or machining the center housing 1108. The air flow 1302 of exhaust gas may enter the chamber 1306 and flows towards the at least one passage 1304 and/or the exit airgap 1200, where it exits the chamber 1306. The recirculation of exhaust gas within the chamber 1306 may facilitate airflow, vortex flow, and/or pressure within the center housing 1108 for an increased exit flow. The increase in pressure may facilitate air flow between the turbine end 1116 and the turbine wheel 1102, thereby cooling the turbine wheel 1102.

INDUSTRIAL APPLICABILITY

In operation, the present disclosure may find applicability in many industries including, but not limited to, the power generation, energy, automotive, sports racing, and car industries. Specifically, the technology of the present disclosure may be used for power generators and/or internal combustion engines of automotive vehicles including, but not limited to, power generators, gasoline generators, diesel generators, intercooled & recuperated power generators, gasoline engines, diesel engines, rotary engines, motors, and the like. While the foregoing detailed description is made with specific reference to power generators combustion engines for automobiles, it is to be understood that its teachings may also be applied onto the other engines and motors such as in power generators, automobiles, cars, trucks, SUVs, CSUVs, sport vehicles, racing vehicles, and other similar vehicles and machines, and other machines having air intake systems or air induction systems that utilize a turbocharger.

Figure 9:
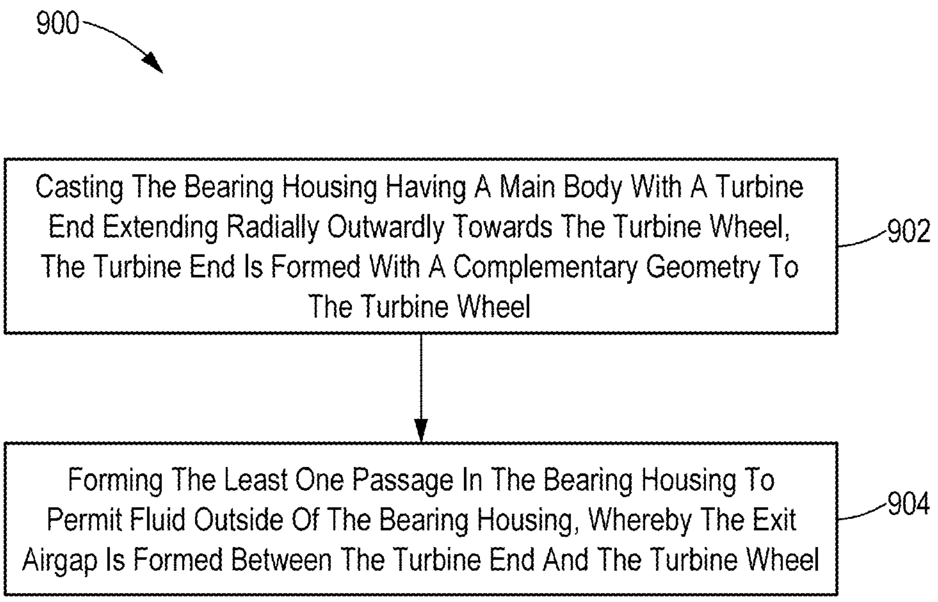
FIG. 9 is a flow chart of a method of forming a bearing housing for a turbocharger, according to one embodiment of the disclosure.

Now referring to FIG. 9, a method of forming a bearing housing 900 for a turbocharger is illustrated, according to one embodiment of the disclosure. In a step 902, the bearing housing 108 is casted having a main body with a turbine end 116 extending radially outwardly towards the turbine wheel 102. The turbine end 116 is formed to have a complementary geometry to the turbine wheel 102.

In a step 904, the at least one passage 204 is formed in the bearing housing 108 to permit fluid outside of the bearing housing 108, whereby the exit airgap 200 is formed between the turbine end 116 and the turbine wheel 102.

The turbocharger 100 may be provided in a power generator that uses two of the turbocharger 100 in series with a power turbine stage, which may be provided without a compressor 104 or compressor stage. The power turbine stage may be connected directly to an alternator or generator for electricity. When provided in a power generator, generator burners may feed exhaust gas directly to the turbocharger 100. The power generator may be an intercooled and recuperated power generator that uses two of the turbocharger 100 in series with the power turbine stage.

Figure 21:
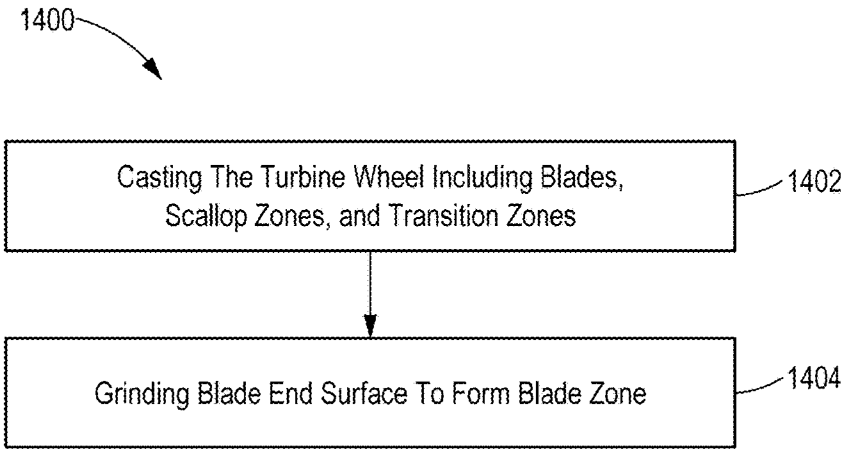
FIG. 21 is a flowchart depicting a sample sequence of steps which may be practiced in accordance with a method of manufacturing a turbocharger of the present disclosure.

Now referring to FIG. 21, it illustrates a method of manufacturing the turbine wheel 1102 of the present disclosure. In a first step 1402, the turbine wheel 1102 is cast as the turbine wheel body 1202 having the shaft attachment zone 1204, the back wall 1206, and the plurality of blades 1208 extending from the turbine wheel body up to the casting surface 1216 having the casting diameter 1214. The casting process forms the scallop zone 1220 between each of the plurality of blades 1208 with a profile represented by FIGS. 14-17 and a resulting constant diameter represented by the scallop diameter 1222. The casting process also forms the transition zone 1224 between the scallop zone 1220 and the plurality of blades 1208. The transition zone 1224 is formed tangential to the scallop diameter 1222 and has the transition radius 1226 into the plurality of blades 1208.

In a final step 1404, the casting surface 1212 on the plurality of blades 1208 is machined by grinding the plurality of blades 1208 down to the machined surface 1216 having the machined diameter 1218. The plurality of blades 1208 remains at the machined diameter 1218 and as a result forms a blade zone, with the machined diameter 1218 larger than the scallop diameter 1222.

The turbine wheel 1102 provides for several advantages over traditional turbine wheels. The scallop zone 1220 of the turbine wheel 1102 allows for lower rotational inertial and lower stresses in the back wall 1206, and is small enough that minimal to no efficiency loss is created. Additionally, rounding of the back wall 1206 including the scallop zone 1220 allows for greater airflow from the back of the turbine wheel 1102 into the exhaust gas path interacting with the plurality of blades 1208. Cooling air flow directed to flow over the rounded areas of the scallop zone into the gaps between the plurality of blades 1208 and the turbine wheel body 1202 may promote increased cooling of the turbine wheel 1102. The turbine wheel 1102 having cooling allows for the turbocharger 1100 to operate at greater exhaust gas temperatures.

From the foregoing, it can be seen that the technology disclosed herein has industrial applicability in a variety of settings such as, but not limited to, turbochargers and bearing housings for engines and power generators, as well as cooling system designs of turbochargers.

What is claimed is:

1. A radial turbine, comprising:

a radial turbine wheel attached to a shaft;

a main body that includes a first end and an opposing second end, wherein the main body includes a bore extending between the first end and the second end, wherein the bore includes bearings configured to support the shaft, wherein at least a portion of the shaft is disposed in the bore, and wherein the turbine wheel is disposed proximate to the first end of the main body;

a heat shield attached to the main body, wherein the heat shield includes a portion that is disposed between the first end of the main body and the turbine wheel, wherein the heat shield includes an opening that is coaxial with the bore of the main body such that a portion of the shaft is received in the opening, wherein a first volume is defined between the first end of the main body of a bearing housing and the portion of the heat shield and a second volume is defined between the portion of the heat shield and the turbine wheel, and wherein the first volume and the second volume are in fluid communication via a radial gap between the portion of the heat shield and the shaft;

a surface of the portion of the heat shield facing the second volume has a cross-sectional shape that is complimentary to a cross-sectional shape of a backwall of the turbine wheel;

at least one air passageway disposed in the bearing housing, wherein the at least one air passageway terminates at the first end of the main body of the bearing housing and is in communication with the first volume, wherein during operation air flows from the at least one air passageway into the first volume and then into the second volume.

2. The radial turbine of claim 1, further comprising a turbine wheel body having a backwall proximate the shaft formed as a circular disk having a backwall thickness;

a plurality of blades formed into the turbine wheel body;

a blade zone where each of the plurality of blades extends from the back wall, having a blade diameter measured from a center of the turbine wheel body;

a scallop zone in the back wall, formed as a rounded surface in a radially outermost surface of the back wall and having a scallop diameter dimensioned such that the scallop diameter is as close as possible to the blade diameter while being radially inboard of a grinding or milling tool that sets the blade diameter; and a transition zone from the scallop zone to the blade zone, the transition zone formed tangential to the scallop diameter and having a transition radius.

3. The radial turbine of claim 1, wherein the at least one air passageway includes a flared portion proximate to the first end of the main body of the bearing housing, wherein the cross-sectional area of the at least one air passageway increases to a maximum cross-sectional area at the first end of the main body of the bearing housing.

4. The radial turbine of claim 1, wherein a first portion of the bearing housing includes a rounded cross-sectional profile at the opening.

5. The radial turbine of claim 4, wherein the portion of the heat shield includes a first surface facing the first volume and a second surface facing the second volume, and wherein the rounded cross-section profile defines a semicircular cross-sectional profile connecting the first surface and the second surface.

6. The radial turbine of claim 1, wherein the first end of the main body of the bearing housing includes a recessed portion that is disposed radially outboard of the bore and radially inboard of the at least one air passageway.

7. The radial turbine of claim 6, wherein a first portion of the bearing housing includes a rounded cross-sectional profile at the opening, wherein the portion of the heat shield includes a first surface facing the first volume and a second surface facing the second volume, and wherein the rounded cross-section profile defines a semicircular cross-sectional profile connecting the first surface and the second surface.

8. The radial turbine of claim 1, further comprising a seal disposed between the shaft and the bore proximate to the first end of the main body of the bearing housing.

9. The radial turbine of claim 8, wherein the seal is at least one chosen from the group consisting of a labyrinth seal and a piston ring.

10. The radial turbine of claim 1, wherein the turbine end is covered with a thermal barrier coating made of a thermal insulating material, the thermal insulating material is chosen from one of a metal-matrix composite, an aluminum-matrix composites, a titanium diboride, an aluminum oxide, an alumina-silica, a boron nitride, a silicon carbide, a vitrium oxide, a yttria-stabilized zirconia, a gadolinium zirconate, a MCrAlY coatings, a plasma-sprayed thermal barrier coating, an electron-beam physical vapor deposition (EB-PVD) thermal barrier coating, and a zirconium oxide.

11. A turbocharger system comprising:

a bearing housing having a main body extending radially outwardly forming a turbine end, the turbine end having a complementary geometry with a turbine wheel;

a shaft rotatably mounted in a shaft bore within the bearing housing, the turbine wheel being provided at an end of the shaft proximate to the turbine end;

at least one air passageway extending through the bearing housing to allow fluid communication with an exterior of the bearing housing;

a heat shield attached to the turbine end, wherein the heat shield includes a portion disposed between the turbine end and the turbine wheel, and a first volume is defined between the turbine end and the heat shield, and a second volume is defined between the heat shield and the turbine wheel, with the first volume and the second volume in fluid communication via a radial gap between the heat shield and the shaft; and a surface of the portion of the heat shield facing the second volume has a cross-sectional shape that is complimentary to a cross-sectional shape of a backwall of the turbine wheel.

12. The turbocharger system of claim 11, the at least one air passageway disposed in the bearing housing, wherein the at least one air passageway terminates at the turbine end of the bearing housing and is in communication with the first volume, wherein during operation air flows from the at least one air passageway into the first volume and then into the second volume.

13. The turbocharger system of claim 12, wherein:

the at least one air passageway includes a flared portion proximate to the turbine end of the bearing housing, wherein the cross-sectional area of the air passageway increases to a maximum cross-sectional area at the first turbine end of the bearing housing;

a first portion of the bearing housing includes a rounded cross-sectional profile at the opening; and the turbine end of the bearing housing includes a recessed portion that is disposed radially outboard of the bore and radially inboard of the at least one air passageway.

14. The turbocharger system of claim 11, wherein the at least one passageway is one chosen from the following:

the at least one passageway is a circumferential slot;

the at least one passageway extends perpendicular to an axis of the shaft in the bearing housing; and the at least one passageway extends parallel to an axis of the shaft in the bearing housing.

15. The turbocharger system of claim 11, further comprising a seal disposed between the shaft and the bore proximate to the turbine end of the bearing housing.

16. A method of forming a bearing housing for a turbocharger having the bearing housing have a main body extending radially outwardly forming a turbine end, the turbine end having a complementary geometry with a turbine wheel, a shaft rotatably mounted in a shaft bore within the bearing housing, the turbine wheel being provided at an end of the shaft proximate to the turbine end, at least one air passageway extending through the bearing housing to allow fluid communication with an exterior of the bearing housing, a heat shield attached to the turbine end, wherein the heat shield includes a portion disposed between the turbine end and the turbine wheel, and a first volume is defined between the turbine end and the heat shield, and a second volume is defined between the heat shield and the turbine wheel, with the first volume and the second volume in fluid communication via a radial gap between the heat shield and the shaft; and a surface of the portion of the heat shield facing the second volume has a cross-sectional shape that is complimentary to a cross-sectional shape of a backwall of the turbine wheel, the method comprising:

casting the bearing housing having the main body with the turbine end extending radially outwardly towards the turbine wheel, the turbine end having the complementary geometry to the turbine wheel;

attaching the heat shield to the bearing housing, the heat shield including the portion that is disposed between the turbine end of the bearing housing and the turbine wheel, wherein the heat shield includes an opening that is coaxial with the bore of the bearing housing such that a portion of the shaft is received in the opening; and forming the at least one air passageway in the bearing housing, wherein the at least one air passageway terminates at the turbine end of the bearing housing and is in communication with the first volume defined between the turbine end of the bearing housing and the heat shield and the second volume defined between the heat shield and the turbine wheel, and during operation air flows from the at least one air passageway into the first volume and then into the second volume.

17. The method of claim 16, further including:

forming the first volume and the second volume in fluid communication via the radial gap between the portion of the heat shield and the shaft.

18. The method of claim 17, further including:

forming a flared portion in the at least one air passageway proximate to the turbine end of the bearing housing, wherein a cross-sectional area of the at least one air passageway increases to a maximum cross-sectional area at the turbine end of the bearing housing;

forming a recessed portion in the turbine end of the bearing housing that is disposed radially outboard of the bore and radially inboard of the at least one air passageway, wherein the recessed portion includes a curved profile such that an axial dimension of the bearing housing toward the turbine wheel increases at decreasing radial distances; and forming the heat shield with a first surface facing the first volume and the surface facing the second volume, wherein the first surface has a cross-sectional shape that is complementary to a cross-sectional shape of the backwall of the turbine wheel.

19. The method of claim 16, further including forming a seal disposed between the shaft and the bore proximate to the turbine end of the bearing housing, wherein the seal is at least one chosen from a group consisting of a labyrinth seal and a piston ring.

* * * * *